US009863643B2

(12) United States Patent
Aihara et al.

(10) Patent No.: US 9,863,643 B2
(45) Date of Patent: Jan. 9, 2018

(54) HEATING COOKER

(71) Applicant: Panasonic Intellectual Property Management Co., Ltd., Osaka-shi, Osaka (JP)

(72) Inventors: Katsuyuki Aihara, Hyogo (JP); Ryuuji Nagata, Hyogo (JP); Kazuyoshi Shichi, Hyogo (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 91 days.

(21) Appl. No.: 15/031,508

(22) PCT Filed: Nov. 6, 2014

(86) PCT No.: PCT/JP2014/005588
§ 371 (c)(1),
(2) Date: Apr. 22, 2016

(87) PCT Pub. No.: WO2015/068393
PCT Pub. Date: May 14, 2015

(65) Prior Publication Data
US 2016/0258631 A1    Sep. 8, 2016

(30) Foreign Application Priority Data

Nov. 6, 2013  (JP) ................. 2013-230014

(51) Int. Cl.
*F24C 7/10*     (2006.01)
*F24C 7/08*     (2006.01)
(Continued)

(52) U.S. Cl.
CPC .......... *F24C 7/082* (2013.01); *C03C 10/0027* (2013.01); *C03C 17/3602* (2013.01);
(Continued)

(58) Field of Classification Search
CPC .......... F24C 7/082; F24C 7/083; F24C 15/10; F24C 15/102; F24C 15/106; C03C 10/0027; C03C 17/3602; C03C 17/3684
See application file for complete search history.

(56) References Cited

U.S. PATENT DOCUMENTS

| 2006/0091135 A1 | 5/2006 | Kondo et al. |
| 2010/0219176 A1 | 9/2010 | Striegler |
| 2012/0187112 A1 | 7/2012 | Demol et al. |

FOREIGN PATENT DOCUMENTS

| EP | 0 437 228 A1 | 7/1991 |
| JP | 2003-086337 A | 3/2003 |

(Continued)

OTHER PUBLICATIONS

Extended Search Report in corresponding European Application No. 14859899.8, dated Nov. 30, 2016, 5 pages.
(Continued)

*Primary Examiner* — Shawntina Fuqua
(74) *Attorney, Agent, or Firm* — Brinks Gilson & Lione

(57) ABSTRACT

A heating cooker includes: a top plate on which a cooking container to be heated is placed; an outer case as a main body having an upper surface on which the top plate is placed; a heater heating the cooking container; and a light emitting device disposed in the outer case, for displaying the heating state. The top plate includes: a glass substrate having a transparent light-transmitting low-expansion crystallized glass made mainly of $Li_2O$—$AL_2O_3$—$SiO_2$ and having β-quartz solid solution, having a crystal size smaller than the wavelength of visible light; a design layer having a black-based color disposed on an undersurface of the glass substrate; a diffusion region disposed partially on an undersurface of the design layer, for diffusedly emitting light from the light emitting device; and a light-blocking layer disposed
(Continued)

on the undersurface of the design layer other than the diffusion region, for blocking light from below.

12 Claims, 7 Drawing Sheets

(51) Int. Cl.
  *F24C 15/10* (2006.01)
  *C03C 10/00* (2006.01)
  *C03C 17/36* (2006.01)
  *C03C 17/44* (2006.01)
(52) U.S. Cl.
  CPC .......... *C03C 17/3684* (2013.01); *C03C 17/44* (2013.01); *F24C 7/083* (2013.01); *F24C 15/10* (2013.01); *F24C 15/102* (2013.01); *F24C 15/106* (2013.01)

(56) References Cited

FOREIGN PATENT DOCUMENTS

| JP | 2007-139310 A | 6/2007 |
| JP | 4133408 B2 | 8/2008 |
| JP | 2010-13346 A | 1/2010 |
| JP | 2010-18512 A | 1/2010 |
| JP | 4779443 B2 | 9/2011 |
| JP | 2012-226850 A | 11/2012 |
| JP | 5092534 B2 | 12/2012 |

OTHER PUBLICATIONS

International Preliminary Report on Patentability, and English language translation thereof, in corresponding International Application No. PCT/JP2014/005588, dated May 19, 2016, 11 pages.

Search Report, and English language translation thereof, in corresponding International Application No. PCT/JP2014/005588, dated Feb. 10, 2015, 5 pages.

HEATING COOKER

This application is a 371 application of PCT/JP2014/005588 having an international filing date of Nov. 6, 2014, which claims priority to JP 2013-230014 filed Nov. 6, 2013. The entire contents of these applications are incorporated herein by reference.

BACKGROUND

1. Technical Field

This disclosure relates to a heating cooker for use on household dining table, countertop, sink, etc., or in business-use kitchen, etc., the heating cooker having a top plate on which a cooking container to be heated is placed. In particular, this disclosure relates to a heating cooker that heats the cooking container to be heated by a heater element disposed under the top plate, to perform cooking, the top plate having thereon a display indicative of the state of heating.

2. Related Art

Among this type of heating cookers, an IH cooker using an induction heating system for heating is becoming a recent mainstream and is popular in terms of its high safety and easy care. This by no means intends to limit the heating system of the present invention to the induction heating. The top plate used in this heating cooker is of a substantially flat shape with excellent design and improved care.

This type of heating cooker, however, embraces a program that the state of heating is hard to recognize, unlike the gas-operated cooker, etc., and therefore performs a display through various schemes using light-emitting elements such as LEDs or a liquid crystal display such as LCD arranged under the operation part or top plate.

Particularly, the top plate arranged on the upper side of the heating cooker is required to be one of excellent design having both light-blocking properties and light-transmitting properties so that the internal structures cannot be seen through during the non-heating but so as to transmit light of the display device displaying the state of heating by use of the light-emitting elements such as LEDs during the heating.

For example, a certain type of top plate for cooker arranged at the upper portion of the cooker is made up of a transparent glass layer, a pearl-like layer arranged on the undersurface of the glass layer, and a light-blocking layer arranged on the undersurface of the pearl-like layer, and is configured to have a viewing window without light-blocking layer above the light source disposed in the cooker as shown in Japanese Patent Laid-open Publication No. 2003-86337 referred as Patent Document 1. The above description uses unchangedly the names of parts used in Patent Document 1.

FIG. 10 is a sectional view of a top plate placed at the upper portion of the cooker described in Patent Document 1. FIG. 11 is a top view of the top plate placed at the upper portion of the cooker described in Patent Document 1.

SUMMARY

The above prior art configuration, however, lacks a specific disclosure about the function to display the state of heating without impairing the design and visibility, such as having the viewing window without light-blocking layer, and has a possibility to impair the original flatness to a large extent.

The display device using the light-emitting elements such as LEDs in particular needs to be spaced apart from the top plate, in response to the heat resistance of the display device, in order to avoid the thermal effect from the cooking container to be heated, and has sometimes undergone a reduction in visibility such as the display position differing (looking recessed in particular) depending on the viewing angle from the top plate upper surface. The structures arranged in the vicinity of the display device are subjected to a number of restrictions (since emitted light is shaded), and the display device needs to be positioned closer, as much as possible, to the top plate in order to improve the visibility. This results in a problem for example that it is necessary for the structures such as the light-emitting elements such as LEDs and a light guide used in this display device and a case of the display device to be formed of expensive materials with high heat resistance.

There is also a problem that reduced visibility and uneven display may be inevitable depending on the position of the arrangement of the display device using the light-emitting elements such as LEDs, irrespective of blocking the portions other than the viewing window by the light-blocking layer as in the prior art document. A problem is also present that since the color viewed from the top plate upper surface is different between the viewing window and the light-blocking layer, a uniform design surface cannot be formed over the entire surface of the top plate.

The above problems are remarkable in black-based top plates in particular. Although the black-based top plates having a certain degree of light-blocking properties and light-transmitting properties are commercially available, use of them has not yet solved the details of the above problems at present.

An object of the present invention is to provide a high-design, low-cost, convenient heating cooker having a black-based top plate and a display device that uses light-emitting elements such as LEDs, capable of improving the reduction of visibility such as the display position differing (looking recessed in particular) depending on the viewing angle from the top plate upper surface and the restrictions (emitted light is shaded) on the structures arranged in the vicinity of the display device, as well as capable of reducing the thermal effect from the cooking container to be heated by spacing the display device apart from the top plate.

In one general aspect, the techniques disclosed here feature: a heating cooker comprising: a top plate on which a cooking container to be heated is placed; an outer case having an upper surface on which the top plate is placed and making up a main body; a heater element heating the cooking container to be heated on the top plate; and a light emitting device disposed in the outer case, for displaying, e.g., the state of heating effected by the heater element, wherein the top plate comprising: a glass substrate in the form of a transparent light-transmitting low-expansion crystallized glass made mainly of $Li_2O$—$AL_2O_3$—$SiO_2$ and having β-quartz solid solution as a main crystal, whose crystal size is smaller than the wavelength of visible light; a design layer having a black-based color disposed on an undersurface of the glass substrate; a diffusion region disposed partially on an undersurface of the design layer, for diffusedly emitting light from the light emitting device, the diffusion region containing a pearl pigment comprised of an inorganic pigment coated with a metal oxide; and a light-blocking layer disposed on the undersurface of the design layer at least at a portion other than the diffusion region, for blocking light from below, the light-blocking layer containing an inorganic pigment.

By virtue of this configuration, in a top plate of a heating cooker using a black-based top plate and in a display device using light-emitting elements such as LEDs, disposition of the diffusion region improves the reduction of visibility such as the display position differing (looking recessed in particular) depending on the viewing angle from the top plate upper surface and the restrictions (emitted light is shaded) on the structures arranged in the vicinity of the display device. More specifically, even in the case that ordinarily a shade appears inevitably when viewed from above from the positional relationship with the structures, the structures' shade is restrained from appearing since the user see the diffusion region. Furthermore, since the display device can be spaced apart from the top plate, the thermal effect from the cooking container to be heated is reduced so that the structures such as the light-emitting elements such as LEDs and the light guide used in this display device and the case of the display device can be formed of inexpensive materials with low heat resistance. Particularly, this is effective for equipment in which the cooking container to be heated is supposed to be placed above the light emitting device. Furthermore, use of the black-based top plate prevents the internal structures such as the display device and the heater element from being seen through during the non-heating (during non-light-emitting), enabling the provision of a high-design, low-cost, convenient heating cooker having both light-blocking properties and light-transmitting properties and presenting uniform color and flatness over the entire surface of the top plate when viewed from the top plate upper surface.

According to the heating cooker of the present invention, there can be implemented a top plate, esp. a black-based plate having both light-blocking properties and light-transmitting properties and having an excellent design without impairing the flatness, as well as a heating cooker superior in visibility for display of the state of heating.

DETAILED DESCRIPTION OF THE PREFERRED EMBODIMENTS

Figure 1:
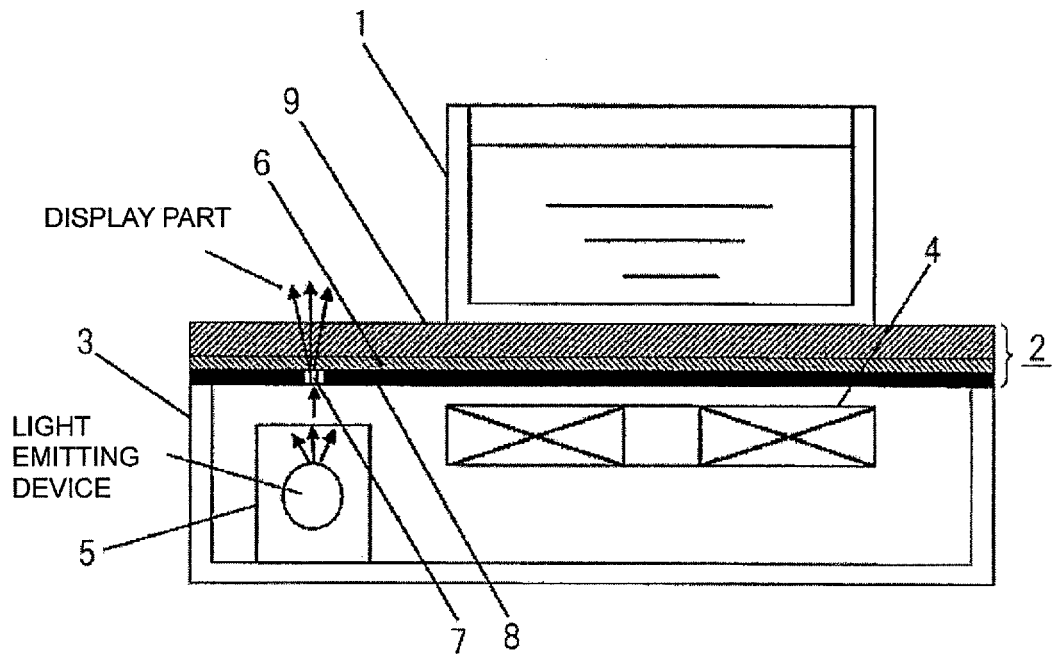
FIG. 1 is a schematic view showing the details of a heating cooker according to a first embodiment of the present invention.

As a heating cooker of a first aspect, a heating cooker including: a top plate on which a cooking container to be heated is placed; an outer ease having an upper surface on which the top plate is placed and making up a main body; a heater element heating the cooking container to be heated on the top plate; and a light emitting device disposed in the outer case, for displaying, e.g., the state of heating effected by the heater element, wherein the top plate comprising: a glass substrate in the form of a transparent light-transmitting low-expansion crystallized glass made mainly of $Li_2O$—$AL_2O_3$—$SiO_2$ and having β-quartz solid solution as a main crystal, whose crystal size is smaller than the wavelength of visible light; a design layer having a black-based color disposed on an undersurface of the glass substrate; a diffusion region disposed partially on an undersurface of the design layer, for diffusedly emitting light from the light emitting device, the diffusion region containing a pearl pigment comprised of an inorganic pigment coated with a metal oxide; and a light-blocking layer disposed on the undersurface of the design layer at least at a portion other than the diffusion region, for blocking light from below, the light-blocking layer containing an inorganic pigment.

By virtue of this configuration, in a top plate of a heating cooker using esp. a black-based top plate, when displaying a pattern on the top plate by light emitting device such as LEDs, disposition of the diffusion region improves the reduction of visibility such as the display position differing (looking recessed in particular) depending on the viewing angle from the top plate upper surface and the restrictions (emitted light is shaded) on the structures arranged in the vicinity of the display device. More specifically, even in the case that ordinarily a shade appears inevitably when viewed from above from the positional relationship with the structures, the structures' shade is restrained from appearing since the user see the diffusion region. Furthermore, since the display device can be spaced apart from the top plate, the thermal effect from the cooking container to be heated is reduced so that the structures such as the light-emitting elements such as LEDs that are light emitting device and the light guide and the case that receives the light-emitting elements can be formed of inexpensive materials with low heat resistance. Particularly, this is effective for equipment in which the cooking container to be heated is supposed to be placed above the light emitting device. Furthermore, use of the black-based top plate prevents the internal structures such as the display device and the heater element from being seen through during the non-heating (during non-light-emitting), enabling the provision of a high-design, low-cost, convenient heating cooker having both light-blocking properties and light-transmitting properties and presenting uniform color and flatness over the entire surface of the top plate when viewed from the top plate upper surface.

Although sintering of the design layer and sintering of the diffusion region are described as being separately performed, concurrent sintering may be performed on the coated and dried design layer and the coated diffusion region, to obtain similar effects.

As a heating cooker of a second aspect, a heating cooker including: a top plate on which a cooking container to be heated is placed; an outer case having an upper surface on which the top plate is placed and making up a main body; a heater element heating the cooking container to be heated on the top plate; and a light emitting device disposed in the outer case, for displaying, e.g., the state of heating effected by the heater element, wherein the top plate comprising: a glass substrate in the form of a black-based colored low-expansion crystallized glass made mainly of $Li_2O$—$AL_2O_3$—$SiO_2$ and containing a black-based colorant as an additive and having β-quartz solid solution as a main crystal; a diffusion region disposed partially on an undersurface of the black-based glass substrate, for diffusedly emitting light from the light emitting device, the diffusion region containing a pearl pigment comprised of an inorganic pigment coated with a metal oxide; and a light-blocking layer disposed on the undersurface of the black-based glass substrate at least at a portion other than the diffusion region, for blocking light from below, the light-blocking layer containing an inorganic pigment.

By virtue of this configuration, in a top plate of a heating cooker using esp. a black-based top plate, when displaying a pattern on the top plate by light emitting device such as LEDs, disposition of the diffusion region improves the reduction of visibility such as the display position differing (looking recessed in particular) depending on the viewing angle from the top plate upper surface and the restrictions (emitted light is shaded) on the structures arranged in the vicinity of the display device. More specifically, even in the case that ordinarily a shade appears inevitably when viewed from above from the positional relationship with the structures, the structures' shade is restrained from appearing since the user see the diffusion region. Furthermore, since the display device can be spaced apart from the top plate, the thermal effect from the cooking container to be heated is reduced so that the structures such as the light-emitting elements such as LEDs that are light emitting device and the light guide and the case that receives the light-emitting elements can be formed of inexpensive materials with low heat resistance. Particularly, this is effective for equipment in which the cooking container to be heated is supposed to be placed above the light emitting device. Furthermore, use of the black-based top plate prevents the internal structures such as the display device and the heater element from being seen through during the non-heating (during non-light-emitting), enabling the provision of a high-design, low-cost, convenient heating cooker having both light-blocking properties and light-transmitting properties and presenting uniform color and flatness over the entire surface of the top plate when viewed from the top plate upper surface.

As a heating cooker of a third aspect, in the first aspect, the top plate has, in the glass substrate and the design layer, 60% or more of infrared transmissivity and 60% or less of visible light transmissivity, upward from the top plate.

By virtue of this configuration, in a top plate of a heating cooker using esp. a black-based top plate and in a display device using light-emitting elements such as LEDs, the amount of visible light required for the visibility can be obtained with increased infrared transmissivity, thereby enabling a heating cooker with an added value to be provided.

As a heating cooker of a fourth aspect, in the first aspect, the top plate has, in the black-based glass substrate, 60% or more of infrared transmissivity and 60% or less of visible light transmissivity, upward from the top plate.

By virtue of this configuration, in a top plate of a heating cooker using esp. a black-based top plate and in a display device using a light-emitting element such as LED, the amount of visible light required for the visibility can be obtained with increased infrared transmissivity, thereby enabling a heating cooker with an added value to be provided.

As a heating cooker of a fifth aspect, in any one of the first to fourth aspects, the top plate has, in the glass substrate and the design layer and the diffusion region or in the black-based glass substrate and the diffusion region, 35 $cd/m^2$ or more of light transmission amount from the light emitting device.

The amount of light transmission of the display device using light-emitting elements such as LEDs directed upward from the top plate is preferably 35 $cd/m^2$ or more in accordance with the requirements for ensuring a good visibility set forth in JIS-Z-8513 (Ergonomics-Office Work Using Visual Display Device-Requirements for Visual Display Device: Corresponding International Standard ISO 9241-3).

By virtue of this configuration, in a top plate of a heating cooker using esp. a black-based top plate and in a display device using light-emitting elements such as LEDs, there can be provided a heating cooker capable of adjustably obtaining the amount of visible light required for the visibility, as well as a heating cooker capable of simplification and rationalization in the configuration such as reducing the number of light-emitting elements such as LEDs and eliminating the need for the disposition of the light guide due to diffusion effect.

As a heating cooker of a sixth aspect, in any one of the first to fifth aspects, the diffusion layer contains an inorganic pigment adjusting color tone.

By virtue of this configuration, in a top plate of a heating cooker using esp. a black-based top plate and in a display device using light-emitting elements such as LEDs, the color tone can be adjusted by inorganic pigments so as to restrain the indicium from being seen through from the top plate upper surface, enabling a heating cooker superior in the visibility and design to be provided.

As a heating cooker of a seventh aspect, in any one of the first to sixth aspects, the pearl pigment has a particle diameter in a range of 1 μm-500 μm, larger than wavelengths of visible light.

By virtue of this configuration, in a top plate of a heating cooker using esp. a black-based top plate and in a display device using light-emitting elements such as LEDs, the diffusion effect arising from light-transmitting properties and light reflection can be adjusted, enabling a heating cooker superior in the visibility to be provided.

As a heating cooker of a eighth aspect, in any one of the first to seventh aspects, the metal oxide that coats the inorganic pigment, of the pearl pigment has a particle diameter of 200 nm or less, smaller than wavelengths of visible light, the metal oxide having a coating thickness of 1 nm-500 nm.

By virtue of this configuration, in a top plate of a heating cooker using esp. a black-based top plate and in a display device using light-emitting elements such as LEDs, the color tone based on light-transmitting properties and light reflection can selectively be adjusted, enabling a heating cooker superior in the visibility and design to be provided.

Embodiments of the present invention will now be described with reference to the drawings. These embodiments are not intended to limit the present invention. Herein, the order of descriptions of the embodiments may differ from the order of the inventions described above. A plurality of inventions may collectively be described.

First Embodiment

FIGS. 1 to 5 are schematic views showing a schematic configuration, etc., of a heating cooker in a first embodiment of the present invention. It is to be noted that components unnecessary for description of the embodiment will be omitted even though they are main components. Hereinafter, description will be given by use of the drawings.

FIG. 1 is a schematic view showing the details of a heating cooker according to a first embodiment of the present invention. As shown in. FIG. 1, this heating cooker includes a top plate 2 on which a cooking container to be heated 1 is placed, an outer case 3 having an upper surface on which the top plate 2 is placed and making up a main body, a heater element 4 positioned below the top plate 2 to inductively heat the cooking container to be heated 1, and a display device 5 using light-emitting elements such as LEDs that display the heating state, etc., of the heater element 4.

The top plate 2 has a light-transmitting low-expansion crystallized glass 9, a design layer 6 having a black-based color disposed on the undersurface of the light-transmitting low-expansion crystallized glass 9, a diffusion region 7 disposed at least partially on the undersurface of the design layer 6 to diffusedly emit light in response to a light emission of the display device 5, and a light-blocking layer 8 disposed on a portion other than the diffusion region 7 to block light from below.

The light-transmitting low-expansion crystallized glass 9 is a transparent crystallized glass (glass substrate 9) made mainly of $Li_2O$—$AL_2O_3$—$SiO_2$ and having β-quartz solid solution as its main crystal, whose crystal size is smaller than the wavelength of visible light.

The design layer 6 expresses black-based color viewed from the top plate 2 upper surface substantially uniformly on the entire surface of the top plate 2. This design layer 6 is obtained by coating the undersurface of the top plate 2 with a luster paint as a first undersurface layer and sintering the same, the luster paint using a diluted solution of an organometallic compound with a black-based color.

The diffusion region 7 emits diffusedly light substantially uniformly depending on patterns such as figures, symbols, and characters formed by the diffusion effect arising from light-transmitting properties and light reflection of the pearl pigment in response to the light emission of the display device 5. This diffusion region 7 is obtained by coating the undersurface of the design layer 6 with a pearl-like paint as a second undersurface layer so as to express patterns such as figures, symbols, and characters and sintering the same, the pearl-like paint containing the pearl pigment comprised of an inorganic pigment coated with a metal oxide, and silicone resin or siliceous sol.

The light-blocking layer 8 blocks light at portions other than the display part. This light-blocking layer 8 is obtained by coating the undersurface of the design layer 6 at the portions other than the diffusion region 7 with a heat-resistant paint as a third undersurface layer and sintering the same, the heat-resistant paint being comprised of a heat-resistant resin, an inorganic pigment, etc., and becoming opaque after sintering. The light-blocking layer 8 is disposed at least on portions other than the diffusion region 7 such that the diffusion region 7 is at least partially exposed. That is, the light-blocking layer 8 may be disposed at least around the diffusion region 7, and the light-blocking layer 8 may be formed so as to partially overlap the perimeter of the diffusion region 7.

In this embodiment, the heating system of the cooking container to be heated 1 such as a pot is induction heating as an example.

Accordingly, the heating cooker of the present invention is not limited to the induction heating system, and it may use, for example, a sheath heater, a radiant heater, a Milacron heater, a halogen heater, a gas, etc.

Although not shown, the heating cooker of the present invention may include a high-frequency power supply device supplying a high-frequency output to the heater element 4, a controller controlling the power supply device, a cooling device suppressing heat generation, an operation device operating ON/OFF of the heating, and a temperature sensor detecting the temperature of the cooking container to be heated.

The form of the display part is optional such as figure, character and pattern and for example it may be substantially circular or substantially semicircular arranged so as to surround the heater element 4, the display device 5, etc.

Components making up the top plate 2 of this heating cooker will be described below.

<Light-Transmitting Low-Expansion Crystallized Glass>

The transparent light-transmitting low-expansion crystallized glass 9 is made mainly of $Li_2O$—$AL_2O_3$—$SiO_2$.

This crystallized glass 9 exhibits transparency since the crystal size is smaller than the wavelength of visible light and since the crystal layer and the glass layer have the same degree of refractive index.

In this crystallized glass 9, β-quartz solid solution crystals showing a negative expansion characteristic and a remaining glass layer showing a positive expansion characteristic are cancelled out so that the crystallized glass 9 exhibits a thermal expansion coefficient of substantially zero as a whole. In this case, the low thermal expansion refers in general to a thermal expansion having a thermal expansion coefficient of $30 \times 10^{-7}/°$ C. or below in absolute value.

This crystallized glass 9 has a high heat resistance and a high thermal shock resistance with a heat-resistant temperature of 750° C. and a thermal shock resistant temperature $\Delta T=800°$ C. In the heating cooker having the top plate 2 arranged on the upper side and mounted with the cooking container to be heated 1, the bottom surface of the top plate 2 in contact with the cooking container to be heated 1 just above the heater element 4 in particular is locally heated (temperature just above the heater element 4: approx. 200-300° C. if the heater element 4 employs induction heating; approx. 500-600° C. if the heater element 4 is a halogen heater or a radiant heater), resulting in a large temperature difference from the ambient temperature (room temperature to approx. 100° C.). Thus, this crystallized glass 9 is suitable for the heating cooker having a larger temperature difference between the bottom surface of the top plate heated as above and the surroundings.

A method of producing this light-transmitting low-expansion crystallized glass 9 will be described. For example, a defoamer, etc., is added to batch materials such as $SiO_2$, $Al_2O_3$, $Li_2O$, $TiO_2$, $ZrO_2$, $P_2O_5$, BaO, $Na_2O+K_2O$, and $As_2O_3$, which are mixed and melted at approx. 1700° C. to mold the glass melt and thereafter gradually cool the molded glass to the room temperature.

When the gradually-cooled glass is subjected to a heat treatment at a nucleation temperature of 750-800° C., approx. 5 nm of $ZrTiO_4$ crystal nuclei crystallize. Subsequently, when subjected to a heat treatment in a temperature range of 850-950° C., β-quartz solid solution crystals ($Li_2O-AL_2O_3-nSiO_2$, n≥2) grow to a size of approx. 50 nm over the crystal nuclei, with the result that an approx. 70 mass % of crystal phase and an approx. 30 mass % of remaining glass phase are complexed into a transparent light-transmitting low-expansion crystallized glass.

<Design Layer>

The design layer 6 has a black-based color. This design layer 6 is obtained by coating the undersurface of the light-transmitting low-expansion crystallized glass 9 with the luster paint as the first undersurface layer. The luster paint is obtained in the form of a diluted solution of an organometallic oxide containing resins such as colophony, balsam, and asphalt, together with one or a mixture in any proportion of two or more of metals such as Au, Pt, Pd, Rh, Ru, Bi, Sn, Ni, Fe, Cu, Cr, Ti, Ca, Si, Ba, Sr, Mg, Ag, Zr, In, and Mn.

This luster paint can optionally change its color tone by selection of the metals after mixing a binder and an ethyl-cellulose-based resin or s nitrocellulose-based resin added to the binder into a paste. The obtained luster paint can be coated on the undersurface of the transparent light-transmitting low-expansion crystallized glass 9 as the first undersurface layer, to be used as the design layer 6.

In the luster paint, the diluted solution of the organometallic oxide for example may be one containing 1-30% of Au, 0.5-20% of Si, and 0.1-10% of Bi in percent by mass. In the luster paint, the binder may be one containing 20% of ethylcellulose, 40% of ethylcellosolve, and 40% of butylcellosolve. This luster paint shows a black-based color tone.

The luster paint coating is preferably screen printing, in which selectively different meshes are arranged so that shading in the film thickness can be altered so as to deal with various characteristics as the design layer. The film thickness is selected in the range of 0.1-10 μm depending on the characteristics as the design layer, and sintering is carried out at the temperature of 700-900° C.

If the film thickness of the luster paint is too thin, it is difficult to exhibit a color tone as the design layer 6. If the film thickness of the luster paint is too thick, Peeling or cracking occurs to reduce the performances as the coating film, which influences the strength of the transparent light-transmitting low-expansion crystallized glass and the performances such as the thermal shock resistance.

This luster paint can be coated uniformly and extremely thinly and can be formed without influencing the strength of the transparent light-transmitting low-expansion crystallized glass 9 and the performance such as the thermal shock resistance. Due to having a proper metallic luster as the coating film, an excellent design is presented and the reflectivity arising from this metallic luster can prevent the interior of the heating cooker to be seen through when viewed from the top plate upper surface. This enables the formation of the top plate 2 having both the moderate light-blocking properties and light-transmitting properties, capable of transmitting light emitted from the display device 5.

<Diffusion Region>

The diffusion region 7 is obtained by at least partially coating the undersurface of the design layer with a pearl-like paint as the second undersurface layer of the transparent light-transmitting low-expansion crystallized glass 9.

The pearl-like paint contains a pearl pigment, silicone resin or siliceous sol, and an organic binder.

The pearl pigment is made up of inorganic pigments such as kaolin, talc, sericite, pyrophyllite, natural mica, synthetic mica, aluminum oxide, silicon oxide, and borosilicate glass, and metal oxides such as titanium oxide, zirconium oxide, iron oxide, chromium oxide, tin oxide, zinc oxide, cobalt oxide, and boron oxide, which are mixed with each other solely or plurally in any proportion, for coating.

The silicone resin is a polymer of an organic silicon compound having a siloxane bond as its backbone and is obtained by dissolving straight silicon varnish, modified silicone varnish, silicon alkyd varnish, silicon epoxy varnish, etc., as necessary, in an organic solvent.

The siliceous sol can be a silica sol, a colloidal silica sol, etc., that are obtained by hydrolyzing ethyl silicate.

The organic binder can be an acrylic resin, an amide resin, an alkyd resin, a cellulose resin, etc.

The pearl pigment may be obtained for example by suspending mica powder in a dilute titanium acid aqueous solution, heating the suspension to 70-100° C., hydrolyzing a titanium salt to crystallize hydrated titanium oxide particles on the mica powder surfaces, thereafter sintering them at a high temperature of 700-1000° C., and coating a mica as the inorganic pigment with a titanium oxide as the metal oxide.

The pearl-like paint may be made up for example of, in percent by mass, 1-30% of pearl pigment, 1-30% of silicone resin or siliceous sol, and 40-98% of organic binder.

The pearl-like paint coating is preferably screen printing, and the diffusion region 7 may be obtained by coating the undersurface of the design layer 6 with patterns such as figures, symbols, characters as the second undersurface layer and sintering the same. This diffusion region 7 allows light to be diffusedly emitted substantially uniformly depending on patterns such as figures, symbols, and characters formed by the diffusion effect arising from light-transmitting properties and light reflection of the pearl pigment in response to the light emission of the display device 5.

Different meshes are selectively arranged so that shading in the film thickness can be altered so as to deal with various characteristics as the diffusion region. The film thickness is selected in the range of 1-20 μM depending on the characteristics as the diffusion region 7, and sintering is carried out at the temperature of 700-900° C. Too thin film thickness prevents the diffusion region 7 from exhibiting its characteristics. If too thick, the transmission effect disappears, resulting in a lowered display visibility. Peeling or cracking also occurs to reduce the coating film performance.

It is difficult for the pearl pigment to exhibit a sufficient diffusion effect if its content is less than 1%. On the other hand, if exceeding 30%, the transmission effect disappears, resulting in a lowered display visibility. Since the paint viscosity lowers with decreasing organic binder's content, there occur inconveniences such as irregularities or blurs in the coating formation.

If the content of silicone resin or siliceous sol is 1% or less, adhesion of the pearl-like paint may possibly lower. On the other hand, if exceeding 30%, silicone resin or siliceous sol coats the pearl pigment, resulting in a reduction in the diffusion effect and disappearance of the transmission effect, which lower the display visibility.

Since the paint viscosity lowers with decreasing organic binder's content, there occur inconveniences such as irregularities or blurs in the coating formation.

<Light-Blocking Layer>

The light-blocking layer 8 blocks light at portions other than the display part. This light-blocking layer 8 is obtained by coating the undersurface of the design layer 6 at the portions other than the diffusion region 7 with a heat-resistant paint as a third undersurface layer of the light-transmitting low-expansion crystallized glass 9. The light-blocking layer 8 may be disposed at least on portions other than the diffusion region 7 so that the diffusion region 7 is at least partially exposed. That is, the light-blocking layer 8 may be disposed at least around the diffusion region 7, and the light-blocking layer 8 may be formed so as to partially overlap the perimeter of the diffusion region 7.

The heat-resistant paint can be one obtained by adding an inorganic pigment for coloring to a heat-resistant resin containing a silicone resin, polyamide resin, fluorocarbon resin, or a complex thereof, and mixing them.

Examples of the inorganic pigment for coloring, specifically white inorganic pigment include $TiO_2$, $ZrO_2$, $ZrSiO_4$, $Al_2O_3$, $3Al_2O_3$-$2SiO_2$, and $Al_2TiO_5$.

Examples of black inorganic pigment include Cr—Fe-based oxide, Co—Mn—Cr—Fe-based oxide, Co—Ni—Cr—Fe-based oxide, and Co—Ni—Cr—Fe—Mn-based oxide.

Examples of gray inorganic pigment include Sn—Sb-based oxide and Sn—Sb—V-based oxide.

Examples of yellow inorganic pigment include Sn—V-based oxide, Zr—V-based oxide, Zr—Si—Pr-based oxide, and Ti—Cr—Sb-based oxide.

Examples of brown inorganic pigment include Zn—Al—Cr—Fe-based oxide and Zn—Mn—Al—Cr—Fe-based oxide.

Examples of green inorganic pigment include Ca—Cr—Si-based oxide, Cr—Al-based oxide, Co—Zn—Al—Cr-based oxide, and Zr—Si—Pr—V-based oxide.

Examples of blue inorganic pigment include Co—Al—Zn-based oxide, Co—Al-based oxide, and Zr—Si-based oxide.

Examples of pink inorganic pigment include Mn—Al-based oxide, Ca—Sn—Si—Cr-based oxide, Sn—Cr-based oxide, and Zr—Si—Fe-based oxide.

These inorganic pigments for coloring may be mixed in any proportion so as to obtain a desired color tone. The inorganic pigment is not limited to those listed hereinabove. For example, an inorganic pigment of another color such as red pigment not listed above may be used. An inorganic pigment exhibiting a color other than those may be used depending on the color of the LEDs used.

For example, some heat-resistant paint is made up of, in percent by mass, 50% of heat-resistant resin and 50% of inorganic pigment. The proportion of the inorganic pigment is preferably 50% or less, and if exceeding 50%, the adhesiveness of the heat-resistant resin may lower. As necessary, an organic solvent, etc., may be contained.

The heat-resistant paint coating is preferably screen printing, and different meshes are selectively arranged so that shading in the film thickness can be altered so as to deal with various characteristics of the light-blocking layer 8. The film thickness is selected in the range of 1-30 μm depending on the characteristics as the light-blocking layer 8, and sintering is carried out at the temperature of 200-450° C. If the film thickness is too thin, it is difficult for the light-blocking layer to exhibit its hiding properties, whereas if too thick, peeling or cracking occurs to reduce the performances of the coating film.

Figure 2:
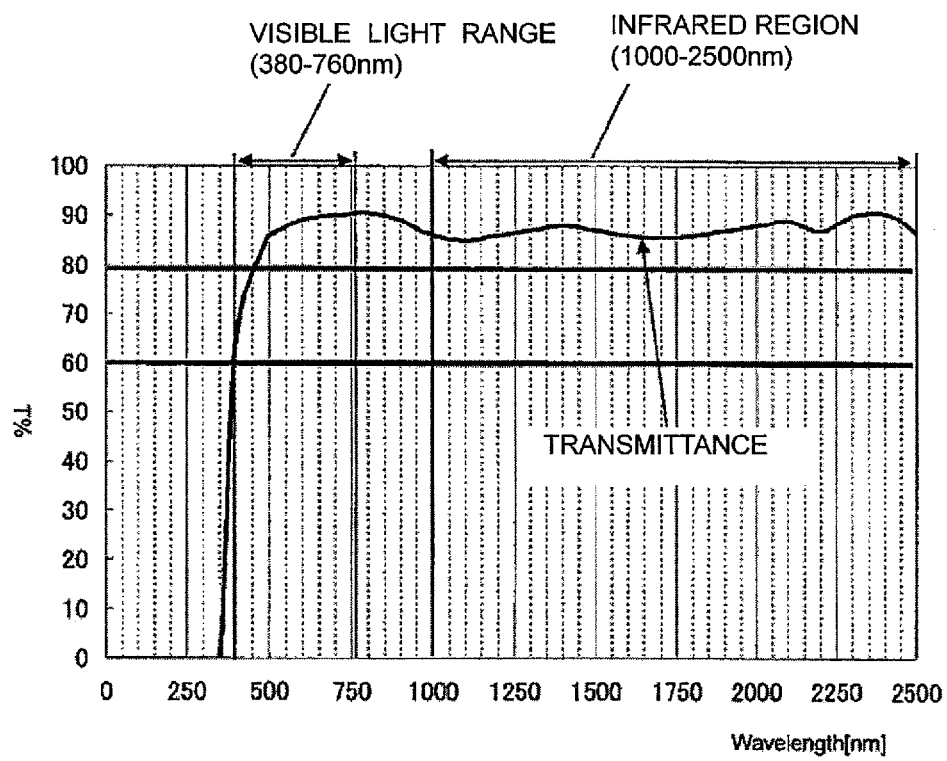
FIG. 2 is a diagrammatic view showing the spectral transmittance of transparent light-transmitting low-expansion crystallized glass of the heating cooker according to the first embodiment of the present invention.

FIG. 2 is a diagrammatic view showing the spectral transmittance of the transparent light-transmitting low-expansion crystallized glass (glass substrate) 9 of the heating cooker according to the first embodiment of the present invention. The top plate 2 is a crystallized glass made mainly of $Li_2O$—$AL_2O_3$—$SiO_2$ and having β-quartz solid solution as its main crystal, whose crystal size is smaller than the wavelength of visible light to consequently exhibit a transparency. The thickness used was for example, approx. 4 mm.

The production method is as already described. The results of measurement, using a spectrophotometer, of transmission spectrum of this transparent light-transmitting low-expansion crystallized glass are as shown in FIG. 2.

As shown in FIG. 2, the glass has a transmittance of approx. 60% or more in minimum and approx. 90% or more in maximum, with approx. 80% or more in average, over the entire visible light range (380-760 nm). It has a transmittance of approx. 80% or more in the infrared region (1000-2500 nm).

This infrared transmissivity is effective in the case of using, as the heater element of the heating cooker, a heater element exerting a radiation effect such as halogen heater or radiant heater, and it is preferred that the transmittance be as high as possible.

This infrared transmissivity is also useful in the case of using an infrared-detection-system non-contact-type temperature sensor as a temperature sensor in the heating cooker of the present invention, and a higher infrared transmissivity is more effective for the detection accuracy, resolution, etc. The infrared transmissivity is preferably 80% or more.

The infrared transmissivity is effective for the amount of light transmission in the display device of the heating cooker according to the present invention, and the amount of light transmission is preferably 35 cd/m$^2$ or more in accordance with the requirements for ensuring a good visibility shown in JIS-Z-8513 (Ergonomics-Office Work Using Visual Display Device-Requirements for Visual Display Device: Corresponding International Standard ISO 9241-3).

Although more light transmission amount is desirable, excessive amount results in a problem that glaring lowers the visibility or makes eyes tired. 100-300 cd/m$^2$ is preferred in the environment where the heating cooker of the present invention is used such as on the dining table, countertop and sink (JIS-Z-9110 General Rules of Recommended Lighting Levels: Maintained Illuminance 300 1x: Corresponding International Standard ISO 9241-3). It is to be understood that optimization of the visible light transmittance becomes necessary since an excessively high visible light transmittance allows the structures such as the display device and the heater element arranged within the interior of the heating cooker of the present invention to be seen through from the top plate upper surface during non-heating (non-light-emission) or allows the indicium of the diffusion region used on the undersurface of the design layer to be seen through.

The adjustment of this infrared transmissivity and the visible light transmittance may be carried out by components, proportion, film thickness, and concentration of the luster paint using a diluted solution of an organic metal compound used for the design layer.

As for the components of the luster paint making up the deign layer 6, metals used in the organometallic compound of Au, Pt, Pd, Rh, Ru, Bi, Sn, Ni, Fe, Cu, Cr, Ti, Ca, Si, Ba, Sr, Mg, Ag, Zr, In, Mn, etc., are used solely or mixed plurally in any proportion, enabling the transmission properties and reflectivity to be adjusted by color tone or glossiness. As for the film thickness of the luster paint, it may optionally be adjusted within the range of 0.1-10 μm so that the light-transmitting properties and reflectivity can be adjusted. As for the concentration of the luster paint, the size of the meshes in the screen printing may optionally be adjusted within the range of #60-#500 so that the transmission properties and reflectivity can be adjusted. Preferably, in particular, the film thickness of the luster paint is within the range of 0.1-5 μm, and the size of the meshes is within the range of #150-#350.

As used herein, the visible light refers to light having a wavelength within the range of 380-780 nm, and infrared refers to light having a wavelength within the range of 1000-2500 nm.

Figure 3:
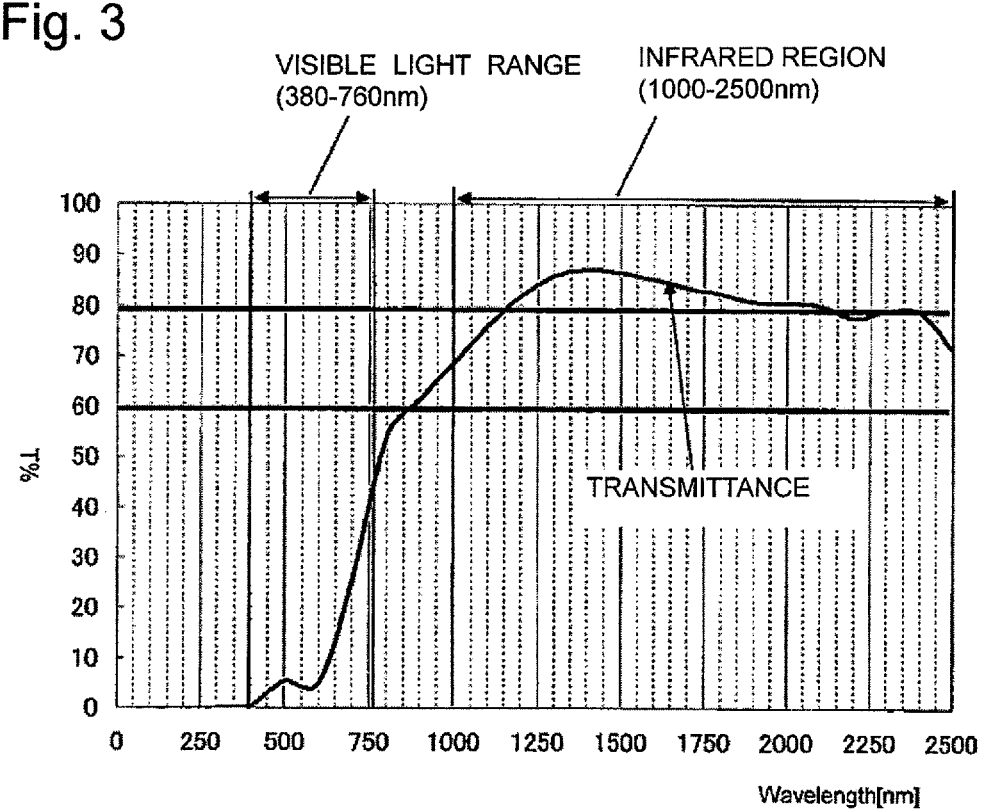
FIG. 3 is a diagrammatic view showing the spectral transmittance of the crystallized glass obtained by coating the undersurface of the transparent light-transmitting low-expansion crystallized glass of the heating cooker with the luster paint as the first layer and sintering the same.

FIG. 3 is a diagrammatic view showing the spectral transmittance of the crystallized glass obtained by coating the undersurface of the transparent light-transmitting low-expansion crystallized glass of the heating cooker in the first embodiment of the present invention with the luster paint as the first layer and sintering the same.

In the top plate 2, the undersurface of the transparent light-transmitting low-expansion crystallized glass was coated with the luster paint that uses a diluted solution of an organometallic compound having a black-based color as the first undersurface layer, which was then sintered, to thereby form the design layer expressing black-based color substantially uniformly over the entire surface of the top plate 2 when viewed from the upper surface of the top plate 2.

At this time, the design layer 6 was obtained by screen-printing, with tetrone mesh 4200, a black-based luster paint in the form of a mixture of a diluted solution of an Au-containing organometallic compound and a binder that uses ethylcellulose on the undersurface of the transparent light-transmitting low-expansion crystallized glass as the first undersurface layer, which was then sintered at a temperature of approx. 850° C.

The film thickness of the design layer 6 is approx. 0.5 μm. For the crystallized glass obtained by coating the undersurface of the transparent light-transmitting low-expansion crystallized glass with this luster paint as the first undersurface layer and sintering the same, the results of measurement of transmission spectrum using the spectrophotometer are as shown in FIG. 3.

As shown in FIG. 3, the glass has a transmittance of approx. 60% or less over the entire visible light range (380-760 nm). It has a transmittance of approx. 60% or more in the infrared region (1000-2500 nm), with approx. 80% of transmittance in average.

At this time, when viewed from the upper surface of the top plate 2 in a room whose brightness is adjusted to approx. 300 1x by use of an illuminometer, the top plate 2 exhibits a black-based, substantially uniform flatness over the entire surface of the top plate 2 without allowing the internal structures such as the display device 5 and the heater element 4 to be seen through.

Figure 4:
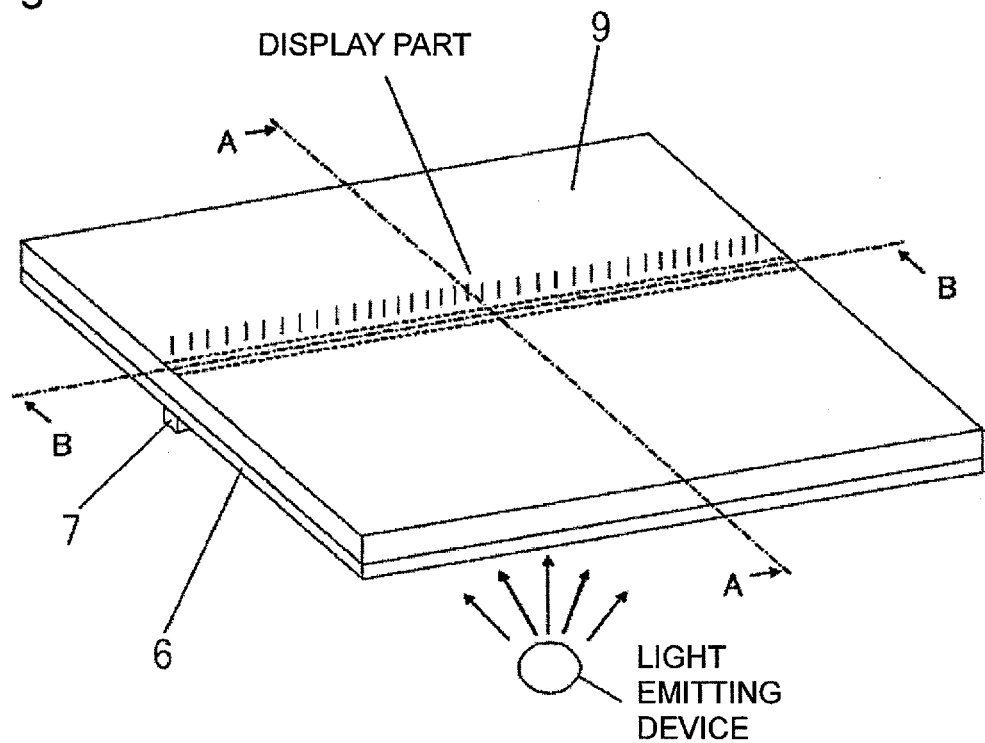
FIG. 4 is a schematic view showing the details of a top plate of the heating cooker.

FIGS. 4 and 5 are a schematic view and a sectional view showing the details of the top plate of the heating cooker in the first embodiment of the present invention. The top plate 2 has the transparent light-transmitting low-expansion crystallized glass 9, the design layer 6 disposed on the undersurface thereof and expressed substantially uniformly over the entire surface of the top plate 2, and the diffusion region 7 disposed partially on the undersurface of the design layer 6. The design layer 6 is obtained by coating the undersurface of the transparent light-transmitting low-expansion crystallized glass with the luster paint that uses a diluted solution of an organometallic compound with a black-based color, as the first undersurface layer, and sintering the same. The diffusion region 7 is obtained by coating the undersurface of the design layer 6 with a pearl pigment comprised of an inorganic pigment coated with a metal oxide and a pearl-like paint that uses silicone resin or siliceous sol, as the second undersurface layer of the top plate 2, so as to express patterns such as figures, symbols, and characters and sintering the same. The diffusion region 7 emits diffusedly light substantially uniformly depending on patterns such as figures, symbols, and characters formed by the diffusion effect arising from light transmission and light reflection of the pearl pigment in response to the light emission of the display device 5.

Figure 5A:
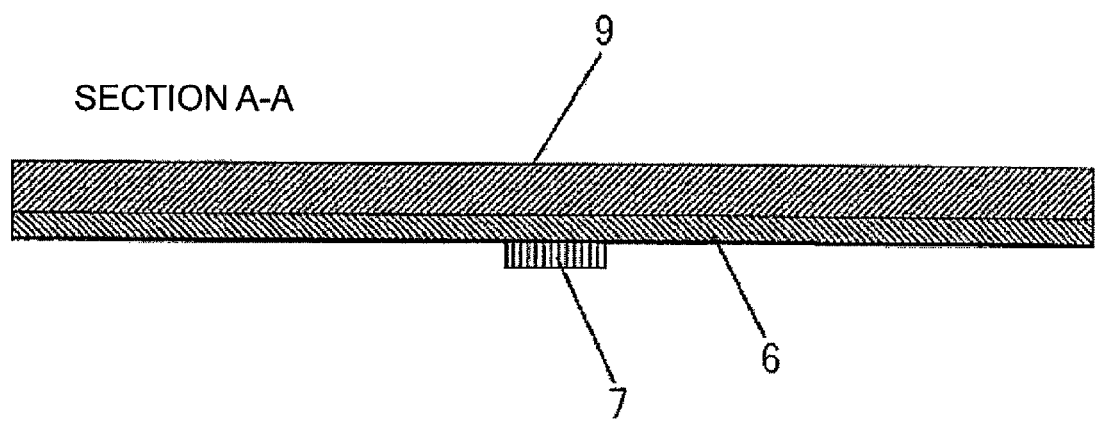
FIG. 5A is a sectional view showing the details of the top plate of the heating cooker as viewed from the direction of A-A in FIG. 4

For the formation of the diffusion region 7, the pearl pigment used was one comprised of natural mica presenting a white pearl-like color, coated with a titanium oxide, having a particle diameter of 10-60 μm and a coating thickness of 200 nm or more. 30 mass % of this pearl pigment, 30 mass % of silicone resin (containing 50% of organic solvent), and the remainder of organic binder, thickening resin, etc., were mixed together to obtain a pearl-like paint. This pearl-like paint was screen-printed with stainless mesh #250 on the undersurface of the design layer 6 as shown in FIG. 4 as the second undersurface layer in the form of a rectilinear figure of approx. 3 mm in width as shown in FIG. 5A of a sectional view as viewed from the direction of A-A in FIG. 4 and in FIG. 5B of a sectional view as viewed from the direction of B-B in FIG. 4, which was then sintered at approx. 850° C. to obtain the diffusion region 7. The film thickness of the diffusion region 7 is approx. 5 μm.

When viewed from the upper surface of the top plate 2 in a room whose brightness is adjusted to approx. 300 1x using the illuminometer, the thus configured top plate 2 exhibits a black-based, substantially uniform flatness over the entire surface of the top plate 2 without allowing the internal structures such as the display device 5 and the heater element 4 to be seen through and without allowing the indicium of the diffusion region 7 to be seen through.

Although more light transmission amount is desirable, excessive amount results in a problem that glaring lowers the visibility or makes eyes tired. 100-300 cd/m² is preferred in the usage environment of the heating cooker of the present invention such as on the dining table, countertop and sink (JIS-Z-9110 General Rules of Recommended Lighting Levels: Maintained Illuminance 300 1x: Corresponding International Standard ISO/CIE 8995-1, 8995-2, 8995-3). It is to be understood that optimization of the visible light transmittance becomes necessary since excessive light amount allows the structures such as the display device and the heater element arranged within the interior of the heating cooker of the present invention to be seen through from the top plate upper surface during non-heating (non-light-emission) or allows the indicium of the diffusion region used on the undersurface of the design layer to be seen through.

The adjustment of the light amount may be carried out by components, proportion, film thickness, and concentration of the pearl-like paint used for the diffusion region 7. As for the components of the pearl-like paint, the light-transmitting properties and reflectivity may be adjusted by the natures, particle shapes, etc., of the inorganic pigments such as kaolin, talc, sericite, pyrophyllite, natural mica, synthetic mica, aluminum oxide, silicon oxide, and borosilicate glass, used for the pearl pigment contained. The light-transmitting properties, reflectivity, selectivity of the reflection color may be adjusted by the natures and the film thickness of the coating layer solely using one of or in the form of a mixture in any proportion of two or more of metal oxides coating these inorganic pigments, such as titanium oxide, zirconium oxide, iron oxide, chromium oxide, tin oxide, zinc oxide, cobalt oxide, and boron oxide. As for the film thickness of the pearl-like paint, the light-transmitting properties and reflectivity may be adjusted by any adjustment within the range of 1-20 μm. As for the concentration of the pearl-like paint, the light-transmitting properties and reflectivity may be adjusted by any adjustment within the range of #60-#500 in the mesh size of the screen printing. Particularly, it is preferred that the film thickness of the pearl-like paint be within the range of 2-15 µm and that the mesh size be within the range of #150-#350.

As for the diffusion region 7, the color tone may be adjusted by inorganic pigments added, so as not to allow the indicium to be seen through from the top plate upper surface.

Examples of the inorganic pigment for coloring used as the pearl-like paint, specifically of white inorganic pigment include $TiO_2$, $ZrO_2$, $ZrSiO_4$, $Al_2O_3$, $3Al_2O_3\text{-}2SiO_2$, and $Al_2TiO_5$.

Examples of black inorganic pigment include Cr—Fe-based oxide, Co—Mn—Cr—Fe-based oxide, Co—Ni—Cr—Fe-based oxide, and Co—Ni—Cr—Fe—Mn-based oxide.

Examples of gray inorganic pigment include Sn—Sb-based oxide and Sn—Sb—V-based oxide.

Examples of yellow inorganic pigment include Sn—V-based oxide, Zr—V-based oxide, Zr—Si—Pr-based oxide, and Ti—Cr—Sb-based oxide.

Examples of brown inorganic pigment include Zn—Al—Cr—Fe-based oxide and Zn—Mn—Al—Cr—Fe-based oxide.

Examples of green inorganic pigment include Ca—Cr—Si-based oxide, Cr—Al-based oxide, Co—Zn—Al—Cr-based oxide, and Zr—Si—Pr—V-based oxide.

Examples of blue inorganic pigment include Co—Al—Zn-based oxide, Co—Al-based oxide, and Zr—Si-based oxide.

Examples of pink inorganic pigment include Mn—Al-based oxide, Ca—Sn—Si—Cr-based oxide, Sn—Cr-based oxide, and Zr—Si—Fe-based oxide.

These inorganic pigments for coloring may be mixed in any proportion so as to obtain a desired color tone.

To obtain the pearl-like paint for use as the diffusion region, these inorganic pigments for coloring are added to the pearl pigment in the proportion of 50% or less by weight relative to the weight of the pearl pigment. The total of the pearl pigment and the inorganic pigments for coloring does not exceed 30% by mass.

For example, if the content of the pearl pigment is 10%, the content of the inorganic pigments for coloring is 5% or less, and if the total of the pearl pigment and the inorganic pigments for coloring is 30% by mass, the content of the inorganic pigments for coloring is 10% or less.

This is because the increased content of the inorganic pigments for coloring impairs the glossiness of the pearl pigment so that the diffusion region cannot exhibit its sufficient diffusion effect. Furthermore, if the total powder content of the pearl pigment and the inorganic pigments for coloring increases, the content of silicone resin or siliceous sol decreases, resulting in a lowered coating film adhesiveness of the diffusion region. If the content of the organic binder reduces, the paint viscosity worsens, resulting in the occurrence of inconveniences such as irregularities or blurs in the film formation.

The particle diameter of the pearl pigment for use as the diffusion region 7 is 1-500 µm that are larger than the wavelength of visible light, thereby adjusting the diffusion effect arising from the light-transmitting properties and light reflection.

In this case, if the particle diameter of the pearl pigment is relatively small as 1-60 µm, a gentle pearl luster is presented so that reflected rays increase in a certain range, resulting in increased repetition of transmission and reflection, and hence in heightened light diffusion effect.

If the particle diameter is in the moderate level as 60-200 µm, a strong pearl luster is presented so that reflected rays lessen in a certain range as compared with the case of relatively small particle diameter, resulting in reduced repetition of transmission and reflection, and hence in lowered diffusion effect with strong reflectivity. If the particle diameter is relatively large as exceeding 200 µm, a sparkling strong luster is presented so that reflected rays lessen in a certain range as compared with the case of moderate level of particle diameter, resulting in further reduced repetition of transmission and reflection, and hence in further lowered diffusion effect with stronger reflectivity.

This nature varies depending on the type of the inorganic pigments for use with the pearl pigment described above and on the type of the metal oxides coating these inorganic pigments, and is optimally selected together with the particle diameter, depending on the visibility when viewed from the top plate upper surface. This pearl pigment repeats reflection of approx. 5% of light and transmission of approx. 95% of light, to exhibit a pearl luster.

For example, if the pearl pigment for use as the diffusion region is in the form of natural mica coated with titanium oxide, it can have both the light-transmitting properties and reflectivity because natural mica has light-transmitting properties and reflectivity in itself and because the coating thickness of titanium oxide is 200 nm or less that is smaller than the wavelength of visible light. When light impinges on the titanium oxide coat, a part of light is reflected on the surface thereof, but a part of light passes therethrough. The transmitted light is partly reflected on the surface of the natural mica (interlayer between the natural mica and titanium oxide coat) but partly passes therethrough. Furthermore, the transmitted light is partly reflected on the interlayer between the titanium oxide coat and the natural mica, but partly passes therethrough. The further transmitted light is partly reflected on the inner surface of the titanium oxide coat, but partly passes therethrough. Such a repetition of reflection and transmission exhibits a pearl luster.

The thickness of this metal oxide may be altered to emphasize a particular color so that color tone based on transmitting light and interfering light can selectively be adjusted.

For example, when the metal oxide coat is formed to a thickness of 60-80 nm and is subjected to light, blue light with short wavelength passes through but yellow light reflects. When formed to a thickness of 80-100 nm and subjected to light, green light passes through but red light reflects. When formed to a thickness of 100-140 nm and subjected to light, yellow light passes through but blue light reflects.

When formed to a thickness of 120-160 nm and subjected to light, the nature is exhibited such that red light passes through but green light reflects. The colors and wavelengths referred to herein represent visible light such as violet of 380-420 nm, blue of 420-490 nm, green of 490-550 nm, yellow of 550-580 nm, and red of 600-760 nm.

In this manner, transmitted or reflected light may selectively be emphasized and combined with colors of light-emitting elements of LEDs, etc., used in the display device, to perform adjustments of diffusion effect and light amount. This nature varies by the types of inorganic pigments for use as the pearl pigment and the types of metal oxides coating these inorganic pigments, which together with the coating thickness are optimally selected depending on the visibility when viewed from the top plate upper surface.

Figure 6A:
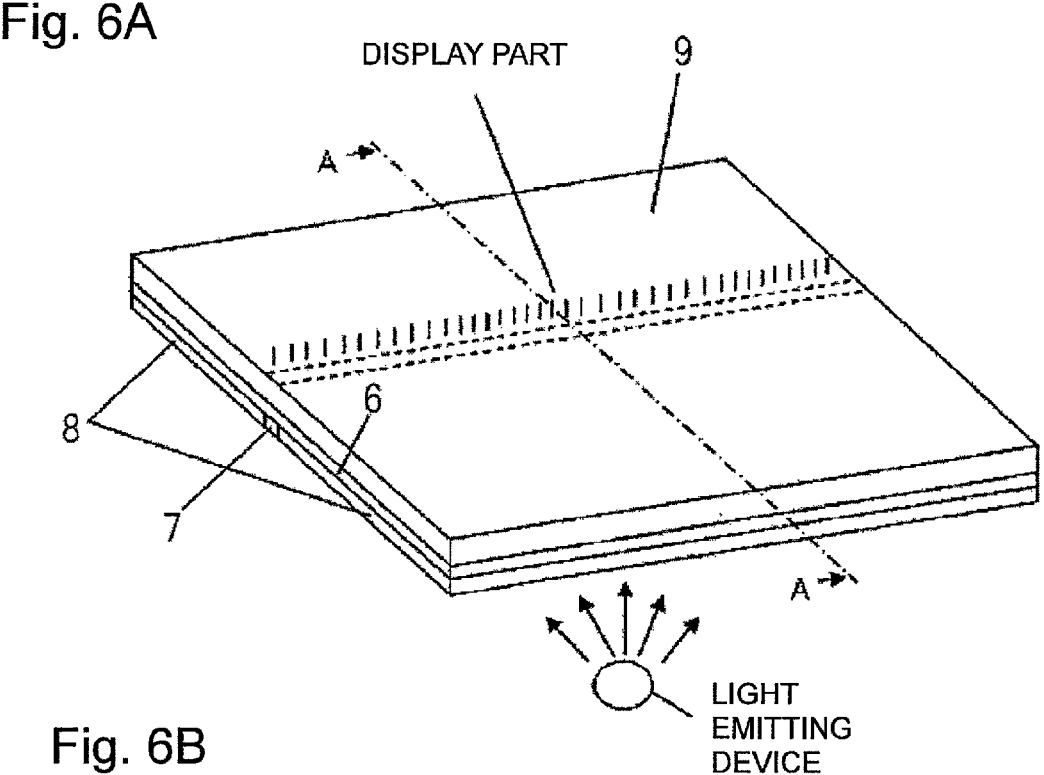
FIG. 6A is a schematic view showing the details of the top plate of the heating cooker.
Figure 6B:
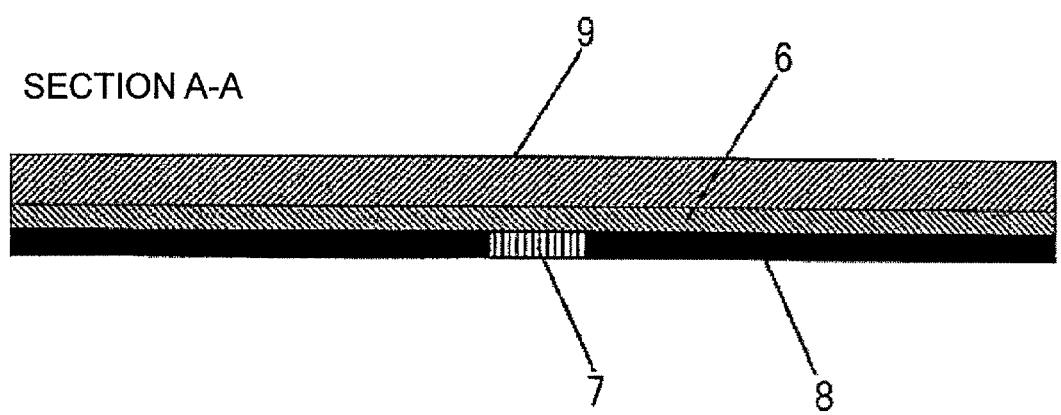
FIG. 6B is a sectional view showing the details of the top plate of the heating cooker.

FIGS. 6A and 6B are schematic and sectional views showing the details of the top plate of the heating cooker in the first embodiment of the present invention. The top plate 2 has the light-blocking layer 8 formed by being coated and sintered as the third undersurface layer on the undersurface of the design layer 6 at portions other than the diffusion region 7, for the purpose of blocking light except the display part, the light-blocking layer 8 being made of a heat-resistant paint containing a heat-resistant resin, inorganic pigments, etc., and becoming opaque after sintering. The light-blocking layer 8 may be formed so as to partially overlap the perimeter of the diffusion region 7.

The light-blocking layer 8 is obtained by mixing, in percent by mass, 70% of silicone resin (containing 50% of organic solvent) and 30% of Fe—Cr—Co black inorganic pigment into the heat-resistant paint, screen-printing the mixture as the third undersurface layer on the undersurface of the design layer 6 at portions other than the diffusion region 7 with a stainless mesh #200, and sintering the same at approx. 350° C. The film thickness is approx. 10 μm.

When viewed from the upper surface of the top plate 2 in a room whose brightness is adjusted to approx. 300 lx using the illuminometer, the top plate 2 configured in this manner exhibits a black-based, substantially uniform flatness over the entire surface of the top plate 2 without allowing the internal structures such as the display device 5 and the heater element 4 to be seen through and without allowing the indicium of the diffusion region 7 to be seen through.

Figure 7:
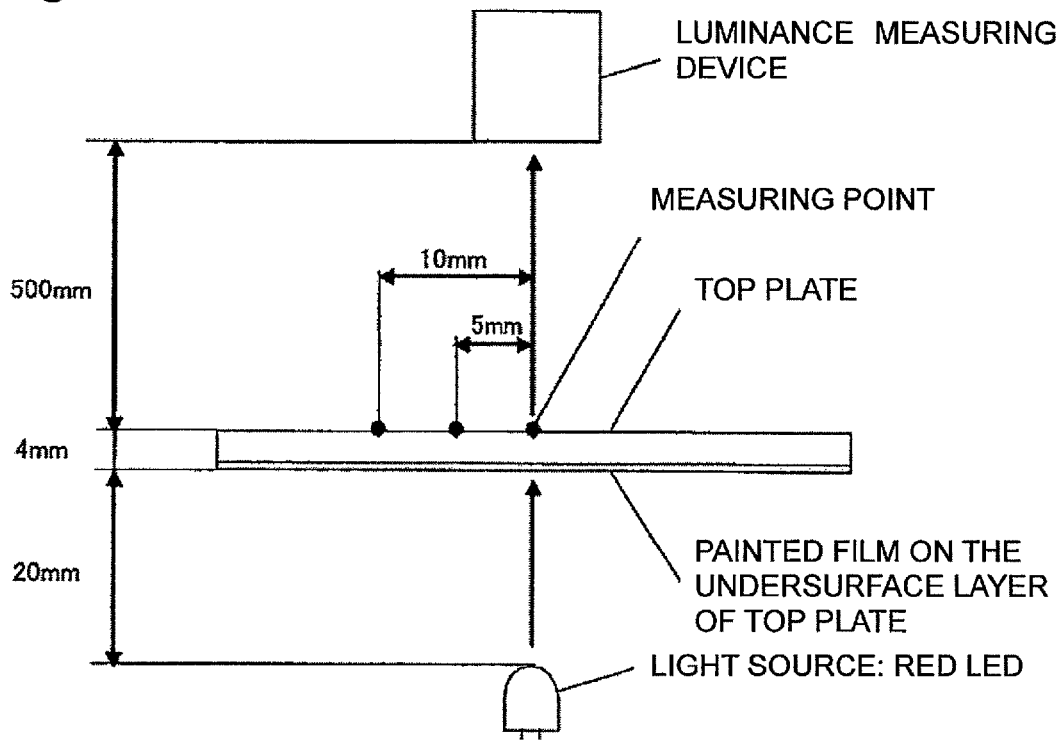
FIG. 7 is a schematic view showing a method of measuring the luminance of the heating cooker.

FIG. 7 is a schematic view showing the details of a method of measuring the luminance of the heating cooker in the first embodiment of the present invention.

As shown in FIG. 7, red LEDs were arranged as a light source at a position 20 mm below the top plate in the first embodiment of the present invention, while a luminance measuring device (color luminance meter: BM-7 manufactured by Topcon TechnoHouse Corp.) was arranged at a position 500 mm above the top plate.

Measurement conditions were such that the measurement is made in a room whose brightness is adjusted to approx. 300 lx using the illuminometer, such that the luminance measurement angle is 0.2° (degrees), and such that the current value is adjusted so as to enable the red LEDs to have a luminance of 5000 cd/m².

Comparison samples were prepared with the pearl pigment mixing ratio in the above diffusion region being 100%, and then reduced to 50%, 25%, 10%, and 5%.

The results of luminance measured at the light source center position under the above measurement conditions are listed in Table 1.

Table 1 is a table showing the luminance measurement results.

TABLE 1

| Samples | Top Plate Configuration Conditions at Measurement Point | | | | | | | | |
|---|---|---|---|---|---|---|---|---|---|
| Transparent Light-Transmitting Low-Expansion Crystallized Glass | — | ○ | ○ | ○ | ○ | ○ | ○ | ○ | ○ |
| Design Layer | — | — | ○ | ○ | ○ | ○ | ○ | ○ | ○ |
| Diffusion Region (%) | — | — | — | 100 | 50 | 25 | 10 | 5 | — |
| Light-Blocking Layer | — | — | — | — | — | — | — | — | ○ |
| Luminance (cd/m²) | 5000 | 4723 | 379 | 31 | 84 | 148 | 283 | 367 | 2 |
| Transmittance (%) | — | 94.5 | 7.6 | 0.6 | 1.7 | 3.0 | 5.7 | 7.3 | 0.03 |

In result, the transparent light-transmitting low-expansion crystallized glass showed a good transparency at the transmittance of 94.5%. In this crystallized glass where the design layer 6 and the diffusion region 7 are printed on the undersurface of the transparent light-transmitting low-expansion crystallized glass, the luminance was found to be 31 cd/m² below 35 cd/m² fulfilling the requirements for ensuring a good visibility indicated in JIS-Z-8513 (Ergonomics-Office Work Using Visual Display Device-Requirements for Visual Display Device: Corresponding International Standard ISO 9241-3).

It was also found that 100-300 cd/m² as proper amount of light is obtained by reducing the ratio of the pearl pigment.

Although in this time of measurement conditions, the current value was adjusted so that the luminance of the red LEDs became 5000 cd/m², this value is one-quarter or less of the current tolerance of these red LEDs, and hence the luminance of the red LEDs may be raised obtain proper amount of light or the number of LEDs may be increased.

Also, in order to obtain the proper amount of light, the mixing, the film thickness, etc., may be altered to raise the visible light transmittance of the design layer 6. In this crystallized glass where the design layer 6 and the light-blocking layer 8 are printed on the undersurface of the transparent light-transmitting low-expansion crystallized glass, the luminance was found to be 2 cd/m² achieving sufficient light blocking.

Visual check also found no light leakage, etc.

The measurement results were listed in Table 2, of luminance at positions 5 mm and 10 mm apart from the light source center under the above measurement conditions except that the current value of the red LEDs was adjusted so that the luminance of the samples at the light source center became 5000 cd/m².

Table 2 is a table showing the luminance measurement results.

TABLE 2

| Samples | | | Top Plate Configuration Conditions at Measurement Point | | | | | |
|---|---|---|---|---|---|---|---|---|
| Transparent Light-Transmitting Low-Expansion Crystallized Glass | | ○ | ○ | ○ | ○ | ○ | ○ | ○ |
| Design Layer | | — | ○ | ○ | ○ | ○ | ○ | ○ |
| Diffusion Region (%) | | — | — | 100 | 50 | 25 | 10 | 5 |
| Luminance (cd/m²) | light source center | 5000 | 5000 | 5000 | 5000 | 5000 | 5000 | 5000 |
| | 5 mm from light source | 43 | 13 | 973 | 753 | 498 | 148 | 88 |
| | 10 mm from light source | 41 | 9 | 309 | 209 | 127 | 36 | 24 |

In result, one without the diffusion region 7 exhibited a luminance of 13 cd/m² at the position 5 mm from the light source center, while one with the diffusion region 7 showed a luminance of 973 cd/m², whereupon it was found that about 70 times more diffusion effect can be obtained in luminance.

It was also found that a reduced mixing ratio of the pearl pigment in the diffusion region 7 leads to a lowering of the diffusion effect. However, it was also found that even if this pearl pigment is reduced to 5%, a luminance of 88 cd/m² is exhibited at the position 5 mm from the light source center, which obtains about 6 times more diffusion effect as compared with the one without the diffusion region 7, and therefore that disposition of this diffusion region 7 ensures a sufficient diffusion effect.

It was further found that the luminance decreases according as the position moves away from the light source center. This unevenness in the amount of light can be improved for example by varying the screen printing meshes to regulate it by shades of print. The unevenness in the amount of light may be improved by arranging the red LEDs at predetermined intervals to add a luminance rise effect, etc., at the portion where light overlaps. It may also be possible to improve the unevenness by adjusting the partial visible light transmittance of the design layer 6.

A similar effect can be obtained also by adding various inorganic pigments for coloring to form the diffusion region 7, to thereby reduce the mixing ratio of the pearl pigment.

Similar or more effects can be obtained by setting the thickness of the metal oxide coat of the pearl pigment used in the diffusion region 7 to 1-500 nm, to thereby selectively adjust the color tone based on the light-transmitting properties and interfering light.

Although the LEDs' color was red in this case, a similar effect can be obtained also by LEDs of a different color such as yellow or green through fine adjustments are required depending on the difference of the wavelength.

Thus, in the top plate of a heating cooker using a black-based top plate in particular and in the display device using light-emitting elements such as LEDs, the reduction of visibility is improved such as the display position differing (looking recessed in particular) depending on the viewing angle from the top plate upper surface. The restrictions (emitted light is shaded) on the structures arranged in the vicinity of the display device are also improved. Furthermore, by spacing the display device apart from the top plate, the thermal effect from the cooking container to be heated is reduced so that the structures such as the light-emitting elements such as LEDs and the light guide used in this display device and the case of the display device can be formed of inexpensive materials with low heat resistance. A high-design, low-cost, convenient heating cooker can be provided that has both light-blocking properties and light-transmitting properties and that presents uniform color and flatness over the entire surface of the top plate when viewed from the top plate upper surface without the internal structures such as the display device and the heater element being seen through during the non-heating.

A heating cooker can be provided that is capable of obtaining and adjusting the amount of light required for the visibility. A heating cooker can also be provided that is capable of simplification and rationalization in the configuration such as reducing the number of light-emitting elements such as LEDs and eliminating the need for the disposition of the light guide, due to diffusion effect.

Second Embodiment

Figure 8:
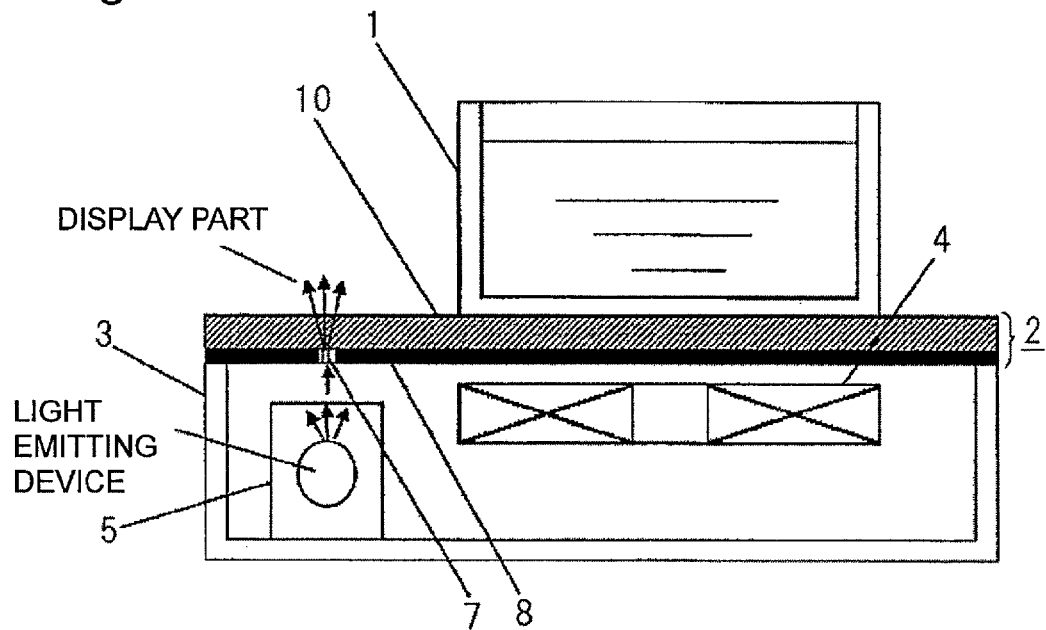
FIG. 8 is a schematic view showing the details of a heating cooker according to a second embodiment of the present invention.
Figure 9:
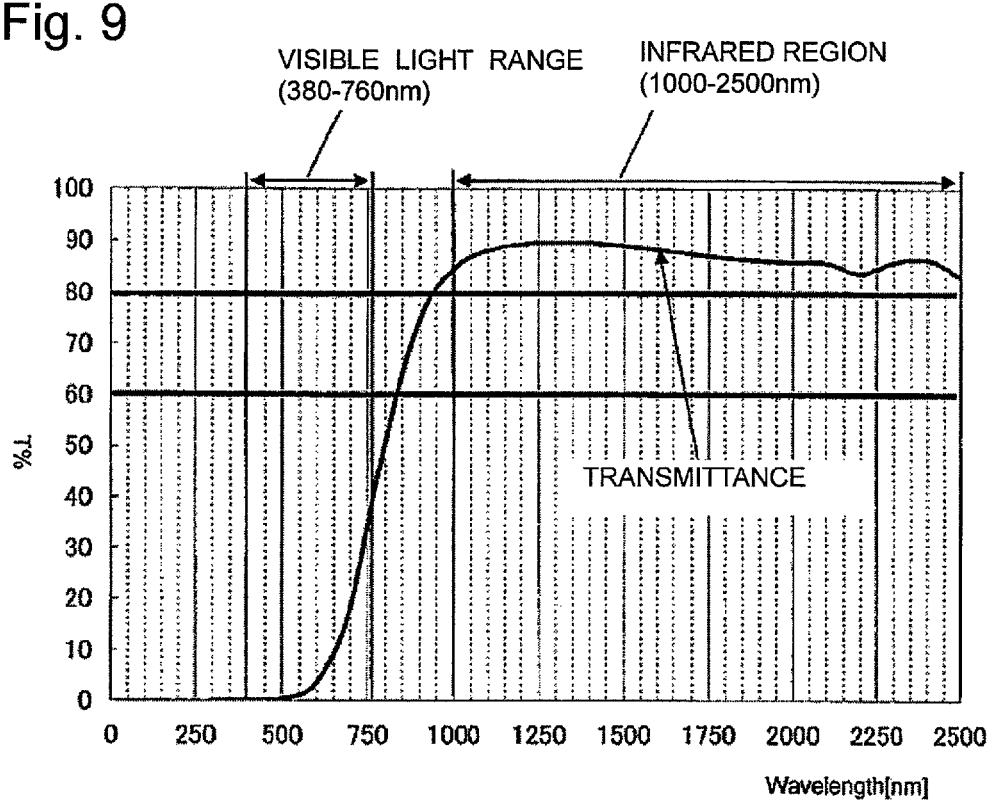
FIG. 9 is a diagrammatic view showing the spectral transmittance of black-based colored low-expansion crystallized glass of the heating cooker.
Figure 10:
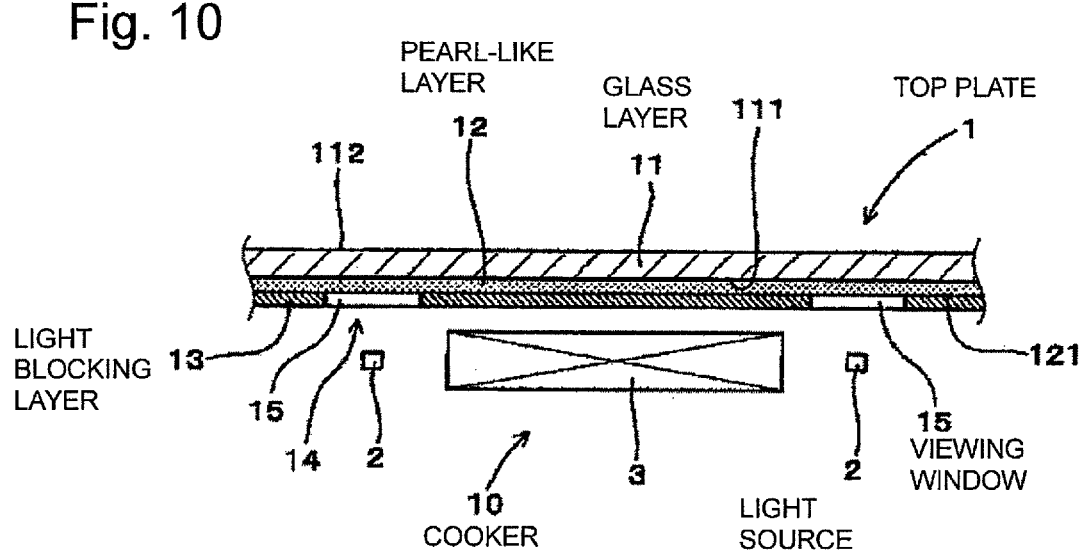
FIG. 10 is a sectional view of a top plate arranged at the upper portion of a cooker described in Patent Document 1.
Figure 11:
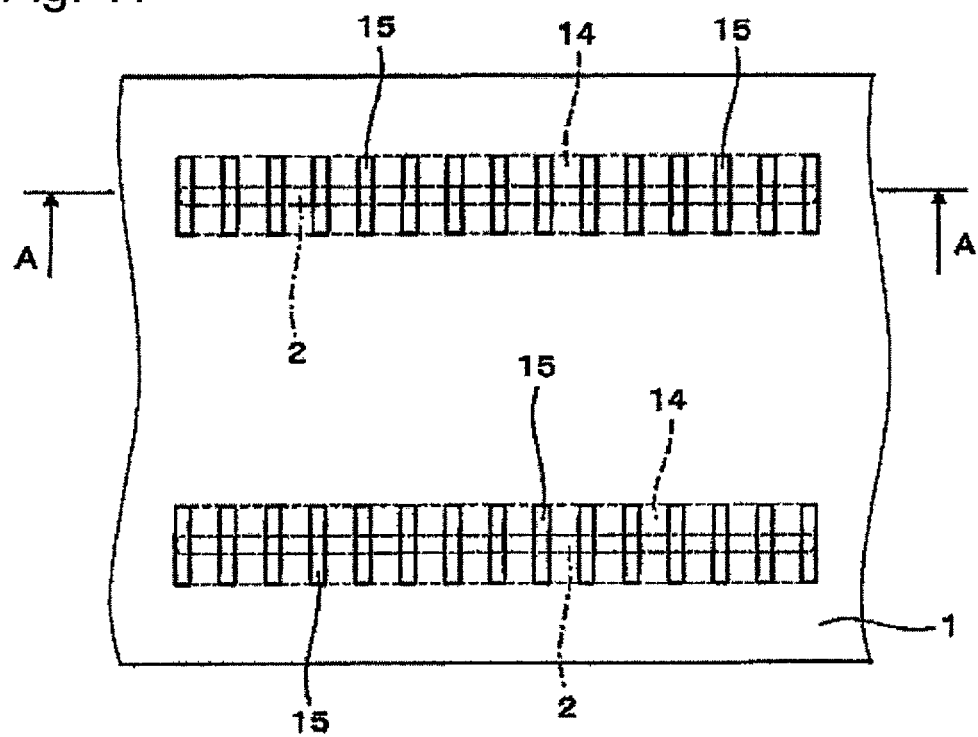
FIG. 11 is a top view of the top plate arranged at the upper portion of the cooker described in Patent Document 1.

FIGS. 8 and 9 show a schematic configuration, etc., of a heating cooker according to a second embodiment of the present invention. In the second embodiment, the glass substrate 9 of the first embodiment was replaced by a black-based glass substrate 10. Some of component parts unnecessary for the description of the embodiment are not shown. Description will be made below with reference to the drawings.

Component parts similar to those of the first embodiment will repeatedly be described with reference to the same drawings.

Some of overlapping parts with the first embodiment will not be described.

FIG. 8 is a schematic view showing the details of the heating cooker according to the second embodiment of the present invention. As shown in FIG. 8, this heating cooker includes the top plate 2 on which the cooking container to be heated 1 is placed, the outer case 3 having an upper surface on which the top plate 2 is placed and making up the main body, the heater element 4 positioned below the top plate 2 to heat the cooking container to be heated 1, and the display device 5 using light-emitting elements such as LEDs that display the heating state, etc., of the heater element 4.

The top plate 2 has a colored low-expansion crystallized glass (black-based glass substrate 10), the diffusion region 7 disposed at least partially on the undersurface of the black-based glass substrate 10 to diffusedly emit light in response to a light emission of the display device 5, and the light-blocking layer 8 disposed on a portion other than the diffusion region 7 to block light from below.

The black-based glass substrate 10 is a black-based colored low-expansion crystallized glass (black-based glass substrate 10) made mainly of $Li_2O$—$AL_2O_3$—$SiO_2$ and containing a black-based colorant as an additive and having β-quartz solid solution as its main crystal.

The diffusion region 7 emits diffusedly light substantially uniformly depending on patterns such as figures, symbols, and characters formed by the diffusion effect arising from light-transmitting properties and light reflection of the pearl pigment in response to the light emission of the display device 5. This diffusion region 7 is obtained by coating the undersurface of the black-based glass substrate 10 with a pearl-like paint as a second undersurface layer so as to express patterns such as figures, symbols, and characters and sintering the same, the pearl-like paint containing the pearl pigment comprised of an inorganic pigment coated with a metal oxide, and silicone resin or siliceous sol.

The light-blocking layer 8 blocks light at portions other than the display part. This light-blocking layer 8 is obtained by coating the undersurface of the black-based glass substrate 10 at the portions other than the diffusion region 7 with a heat-resistant paint as a third undersurface layer and sintering the same, the heat-resistant paint being comprised of a heat-resistant resin, an inorganic pigment, etc., and becoming opaque after sintering. The light-blocking layer 8 is disposed at least on portions other than the diffusion region 7 such that the diffusion region 7 is at least partially exposed. That is, the light-blocking layer 8 may be disposed at least around the diffusion region 7, and the light-blocking layer 8 may be formed so as to partially overlap the perimeter of the diffusion region 7.

In this embodiment, the heating system of the cooking container to be heated 1 such as a pot is induction heating as an example.

Accordingly, the heating cooker of the present invention is not limited to the induction heating system, and it may use, for example, a sheath heater, a radiant heater, a Milacron heater, a halogen heater, gas, etc.

Although not shown, the heating cooker of the present invention may include the high-frequency power supply device supplying a high-frequency output to the heater element 4, the controller controlling the power supply device, the cooling device suppressing heat generation, the operation device operating ON/OFF of the heating, and the temperature sensor detecting the temperature of the cooking container to be heated.

The form of the display part is optional such as figure, character, and pattern and for example it may be substantially circular or substantially semicircular arranged so as to surround the heater element, the display device, etc.

Components making up the top plate 2 of this heating cooker will be described below.

<Colored Low-Expansion Crystallized Glass (Black-Based Glass Substrate 10)>

This colored black-based glass substrate is made mainly of $Li_2O$—$Al_2O_3$—$SiO_2$ and has a composition containing, e.g., approx. 5% of $TIO_2$ as a nucleating agent and approx. 0.1% of $V_2O_5$ as a colorant.

Batch materials of this composition are melted at approx. 1700° C. to mold the glass melt and thereafter gradually cool the molded glass to the room temperature. When the gradually-cooled glass is subjected to a heat treatment at a nucleation temperature of 750-800° C., approx. 5 nm of $ZrTiO_4$ crystal nuclei crystallize. Subsequently, when subjected to a heat treatment in a temperature range of 850-950° C., β-quartz solid solution crystals ($Li_2O$—$AL_2O_3$-$nSiO_2$, n≥2) grow to a size of approx. 50 nm over the crystal nuclei, with the result that an approx. 70 mass % of crystal phase and an approx. 30 mass % of remaining glass phase are complexed into a black-based colored low-expansion crystallized glass based on V and Ti.

This crystallized glass has a crystal size smaller than the wavelength of visible light and transmits a certain amount of visible light, with Ti (a part of the nucleating agent) and V being concentrated in the approx. 30 mass % of remaining glass phase to absorb visible light, to be seen in black color by reflected light.

As the colorant, transition metal oxides such as $Cr_2O_3$, $MnO_2$, $Fe_2O_3$, CoO, NiO, CuO, $V_2O_5$, $Bi_2O_3$ are used solely or mixed plurally in any proportion, to be added to obtain a desired color tone.

In this crystallized glass, β-quartz solid solution crystals showing a negative expansion characteristic and the remaining glass layer showing a positive expansion characteristic are cancelled out to exhibit a thermal expansion coefficient of substantially zero (the low thermal expansion refers in general to a thermal expansion having a thermal expansion coefficient of $30 \times 10^{-7}/°$ C. or below in absolute value).

This crystallized glass has a high heat resistance and a high thermal shock resistance with a heat-resistant temperature of 750° C. and a thermal shock resistant temperature ΔT-800° C. In the heating cooker having the top plate 2 arranged on the upper side and mounted with the cooking container to be heated 1, the bottom surface of the top plate 2 in contact with the cooking container to be heated 1 just above the heater element 4 in particular is locally heated (temperature just above the heater element: approx. 200-300° C. if the heater element 4 employs induction heating; approx. 500-600° C. if the heater element 4 is a halogen heater or a radiant heater), resulting in a large temperature difference from the ambient temperature (room temperature to approx. 100° C.). Thus, this crystallized glass is suitable for the heating cooker having a larger temperature difference between the bottom surface of the top plate heated as above and the surroundings.

<Diffusion Region>

The diffusion region 7 is obtained by at least partially coating the undersurface of the colored low-expansion crystallized glass 10 with a pearl-like paint as the first undersurface layer.

The pearl-like paint contains a pearl pigment, silicone resin or siliceous sol, and an organic binder.

The pearl pigment is made up of inorganic pigments such as kaolin, talc, sericite, pyrophyllite, natural mica, synthetic mica, aluminum oxide, silicon oxide, and borosilicate glass, and metal oxides such as titanium oxide, zirconium oxide, iron oxide, chromium oxide, tin oxide, zinc oxide, cobalt oxide, and boron oxide, which are mixed with each other solely or plurally in any proportion, for coating.

The silicone resin is a polymer of an organic silicon compound having a siloxane bond as its backbone and is obtained by dissolving straight silicon varnish, modified silicone varnish, silicon alkyd varnish, silicon epoxy varnish, etc., as necessary, in an organic solvent.

The siliceous sol can be a silica sol, a colloidal silica sol, etc., that are obtained by hydrolyzing ethyl silicate.

The organic binder can be an acrylic resin, an amide resin, an alkyd resin, a cellulose resin, etc.

The pearl pigment may be obtained for example by suspending mica powder in a dilute titanium acid aqueous solution, heating the suspension to 70-100° C., hydrolyzing a titanium salt to crystallize hydrated titanium oxide particles on the mica powder surfaces, thereafter sintering them at a high temperature of 700-1000° C., and coating a mica as the inorganic pigment with a titanium oxide as the metal oxide.

The pearl-like paint may be made up for example of, in percent by mass, 1-30% of pearl pigment, 1-30% of silicone resin or siliceous sol, and 40-98% of organic binder.

The pearl-like paint coating is preferably screen printing, and the diffusion region 7 may be obtained by coating the undersurface of the colored low-expansion crystallized glass 10 with patterns such as figures, symbols, characters as the second undersurface layer and sintering the same. This diffusion region 7 allows light to be diffusedly emitted substantially uniformly depending on patterns such as figures, symbols, and characters formed by the diffusion effect arising from light-transmitting properties and light reflection of the pearl pigment in response to the light emission of the display device 5.

Different meshes are selectively arranged so that shading in the film thickness can be altered so as to deal with various characteristics as the diffusion region. The film thickness is selected in the range of 1-20 μm depending on the characteristics as the diffusion region 7, and sintering is carried out at the temperature of 700-900° C. Too thin film thickness prevents the diffusion region 7 from exhibiting its characteristics. If too thick, the transmission effect disappears, resulting in a lowered display visibility. Peeling or cracking also occurs to reduce the coating film performance.

It is difficult for the pearl pigment to exhibit a sufficient diffusion effect if its content is less than 1%. On the other hand, if exceeding 30%, the transmission effect disappears, resulting in a lowered display visibility. Since the paint viscosity lowers with decreasing organic binder's content, there occur inconveniences such as irregularities or blurs in the coating formation.

If the content of silicone resin or siliceous sol is 1% or less, adhesion of the pearl-like paint may possibly lower. On the other hand, if exceeding 30%, silicone resin or siliceous sol coats the pearl pigment, resulting in a reduction in the diffusion effect and disappearance of the transmission effect, which lower the display visibility.

Since the paint viscosity lowers with decreasing organic binder's content, there occur inconveniences such as irregularities or blurs in the coating formation.

<Light-Blocking Layer>

The light-blocking layer 8 blocks light at portions other than the display part. This light-blocking layer 8 is obtained by coating the undersurface of the colored low-expansion crystallized glass 10 at the portions other than the diffusion region 7 with a heat-resistant paint as a second undersurface layer. The light-blocking layer 8 may be disposed at least on portions other than the diffusion region 7 so that the diffusion region 7 is at least partially exposed. That is, the light-blocking layer 8 may be disposed at least around the diffusion region 7, and the light-blocking layer 8 may be formed so as to partially overlap with the perimeter of the diffusion region 7.

The heat-resistant paint can be one obtained by adding an inorganic pigment for coloring to a heat-resistant resin containing a silicone resin, polyamide resin, fluorocarbon resin, or a complex thereof, and mixing them.

Examples of the inorganic pigment for coloring, specifically white inorganic pigment include $TiO_2$, $ZrO_2$, $ZrSiO_4$, $Al_2O_3$, $3Al_2O_3$-$2SiO_2$, and $Al_2TiO_5$.

Examples of black inorganic pigment include Cr—Fe-based oxide, Co—Mn—Cr—Fe-based oxide, Co—Ni—Cr—Fe-based oxide, and Co—Ni—Cr—Fe—Mn-based oxide.

Examples of gray inorganic pigment include Sn—Sb-based oxide and Sn—Sb—V-based oxide.

Examples of yellow inorganic pigment include Sn—V-based oxide, Zr—V-based oxide, Zr—Si—Pr-based oxide, and Ti—Cr—Sb-based oxide.

Examples of brown inorganic pigment include Zn—Al—Cr—Fe-based oxide and Zn—Mn—Al—Cr—Fe-based oxide.

Examples of green inorganic pigment include Ca—Cr—Si-based oxide, Cr—Al-based oxide, Co—Zn—Al—Cr-based oxide, and Zr—Si—Pr—V-based oxide.

Examples of blue inorganic pigment include Co—Al—Zn-based oxide, Co—Al-based oxide, and Zr—Si-based oxide.

Examples of pink inorganic pigment include Mn—Al-based oxide, Ca—Sn—Si—Cr-based oxide, Sn—Cr-based oxide, and Zr—Si—Fe-based oxide.

These inorganic pigments for coloring may be mixed in any proportion so as to obtain a desired color tone.

For example, some heat-resistant paint is made up of, in percent by mass, 50% of heat-resistant resin and 50% of inorganic pigment. The proportion of the inorganic pigment is preferably 50% or less, and if exceeding 50%, the adhesiveness of the heat-resistant resin may lower. As necessary, an organic solvent, etc., may be contained.

The heat-resistant paint coating is preferably screen printing, and different meshes are selectively arranged so that shading in the film thickness can be altered so as to deal with various characteristics of the light-blocking layer 8. The film thickness of the heat-resistant paint is selected in the range of 1-30 μm depending on the characteristics of the light-blocking layer 8, and sintering is carried out at the temperature of 200-450° C. If the film thickness is too thin, it is difficult for the light-blocking layer to exhibit hiding properties, whereas if too thick, peeling or cracking occurs to reduce the performances of the coating film.

FIG. 9 is a diagrammatic view showing the spectral transmittance of the colored low-expansion crystallized glass (black-based glass substrate 10) of the heating cooker according to the second embodiment of the present invention. The top plate 2 is a black-based colored low-expansion crystallized glass made mainly of $Li_2O$—$AL_2O_3$—$SiO_2$ and containing a black-based colorant as an additive and having β-quartz solid solution as its main crystal. The thickness used was for example approx. 4 mm. The production method is as already described. The results of measurement, using a spectrophotometer, of transmission spectrum of this black-based colored low-expansion crystallized glass are as shown in FIG. 9.

As shown in FIG. 9, the glass exhibits a transmittance of approx. 60% or less over the entire visible light range (380-760 nm). It exhibits a transmittance of 60% or more, and approx. 80% in average in the infrared region (1000-2500 nm).

This infrared transmissivity is effective in the case of using, as the heater element of the heating cooker of the present invention, the heater element exerting a radiation effect such as the halogen heater or the radiant heater, and it is preferred that the transmittance be as high as possible.

This infrared transmissivity is also useful in the case of using an infrared-detection-system non-contact-type temperature sensor as the temperature sensor in the heating cooker of the present invention, and a higher infrared transmissivity is more effective for the detection accuracy, resolution, etc. The infrared transmissivity is preferably 80% or more.

The visible light transmittance is effective for the amount of light transmission in the display device of the heating cooker according to the present invention, and the amount of light transmission is preferably 35 cd/m² or more in accordance with the requirements for ensuring a good visibility indicated in JIS-Z-8513 (Ergonomics-Office Work Using Visual Display Device-Requirements for Visual Display Device: Corresponding International Standard ISO 9241-3).

Although more light transmission amount is desirable, excessive amount results in a problem that glaring reduces the visibility or makes eyes tired. 100-300 cd/m² is preferred in the environment where the heating cooker of the present invention is used such as on the dining table, countertop and sink (JIS-Z-9110 General Rules of Recommended Lighting Levels: Maintained Illuminance 300 1x: Corresponding International Standard ISO/CIE 8995-1, 8995-2, 8995-3). It is to be understood that optimization of the visible light transmittance becomes necessary since an excessively high visible light transmittance allows the structures such as the display device and the heater element arranged within the interior of the heating cooker of the present invention to be seen through from the top plate upper surface during non-heating or allows the indicium of the diffusion region used on the undersurface of the design layer to be seen through.

The adjustment of this infrared transmissivity and the visible light transmittance may be carried out by adding one of or a mixture, in any proportion, of two or more of transition metal oxides such as $Cr_2O_3$, $MnO_2$, $Fe_2O_3$, CoO, NiO, CuO, $V_2O_5$, $Bi_2O_3$, which are colorants used in the colored low-expansion crystallized glass, to thereby adjust the light absorption, the light-transmitting properties and reflectivity.

As used herein, the visible light refers to light having a wavelength within the range of 380-780 nm, and infrared refers to light having a wavelength within the range of 1000-2500 nm.

When viewed from the upper surface of the top plate 2 in a room whose brightness is adjusted to approx. 300 1x using the illuminometer, the top plate 2 exhibits a black-based, substantially uniform flatness over the entire surface of the top plate 2 without allowing the internal structures such as the display device 5 and the heater element 4 to be seen through.

The diffusion region 7 may be obtained by coating at least partially the undersurface of the black-based colored low-expansion crystallized glass with a pearl pigment comprised of an inorganic pigment coated with a metal oxide, and a pearl-like paint that uses silicone resin or siliceous sol, as the first undersurface layer, so as to express patterns such as figures, symbols, and characters, and sintering the same. This diffusion region 7 emits diffusedly light substantially uniformly depending on patterns such as figures, symbols, and characters formed by the diffusion effect arising from light transmission and light reflection of the pearl pigment in response to the light emission of the display device 5.

Figure 5B:
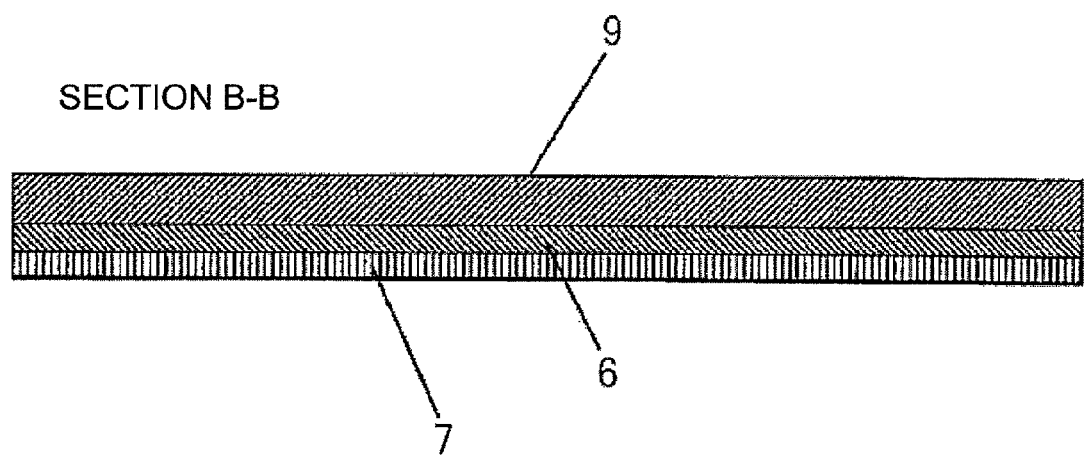
FIG. 5B is a sectional view showing the details of the top plate of the heating cooker as viewed from the direction of B-B in FIG. 4.

For the formation of the diffusion region 7, the pearl pigment used was one comprised of natural mica presenting a white pearl-like color, coated with a titanium oxide, having a particle diameter of 10-60 μm and a coating thickness of 200 nm or more. 30 mass % of this pearl pigment, 30 mass % of silicone resin (containing 50% of organic solvent), and the remainder of organic binder, a thickening resin, etc., were mixed together to obtain a pearl-like paint. This pearl-like paint was screen-printed with stainless mesh #250 on the undersurface of the black-based colored low-expansion crystallized glass as shown in FIG. 8 as the first undersurface layer in the form of a rectilinear figure of approx. 3 mm in width as shown in FIGS. 5A and 5B, which was then sintered at approx. 850° C. to obtain the diffusion region 7. The film thickness of the diffusion region 7 is approx. 5 μm.

When viewed from the upper surface of the top plate 2 in a room whose brightness is adjusted to approx. 300 1x using the illuminometer, the thus configured top plate 2 exhibits a black-based, substantially uniform flatness over the entire surface of the top plate 2 without allowing the internal structures such as the display device 5 and the heater element 4 to be seen through and without allowing the indicium of the diffusion region 7 to be seen through.

The top plate 2 has the light-blocking layer 8, for the purpose of blocking light except the display part, formed by coating the undersurface of the black-based glass substrate 10 at the portions other than the diffusion region 7 with a heat-resistant paint comprised of a heat-resistant resin, an inorganic pigment, etc., and becoming opaque after sintering, and sintering the same. The light-blocking layer 8 is disposed at least on portions other than the diffusion region 7 such that the diffusion region 7 is at least partially exposed. That is, the light-blocking layer 8 may be disposed at least around the diffusion region 7, and the light-blocking layer 8 may be formed so as to partially overlap the perimeter of the diffusion region 7.

The light-blocking layer 8 is obtained by mixing, in percent by mass, 70% of silicone resin (containing 50% of organic solvent) and 30% of Fe—Cr—Co black inorganic pigment into the heat-resistant paint, screen-printing the mixture as the second undersurface layer on the undersurface of the black-based colored low-expansion crystallized glass at portions other than the diffusion region 7 with a stainless mesh #200, in the same manner as FIGS. 5A and 5B, and sintering the same at approx. 350° C. The film thickness is approx. 10 μm.

When viewed from the upper surface of the top plate 2 in a room whose brightness is adjusted to approx. 300 1x using the illuminometer, the top plate 2 configured in this manner exhibits a black-based, substantially uniform flatness over the entire surface of the top plate 2 without allowing the internal structures such as the display device 5 and the heater element 4 to be seen through and without allowing the indicium of the diffusion region 7 to be seen through.

In this manner, according to this embodiment, it was found that use of the black-based colored low-expansion crystallized glass (black-based glass substrate 10) enables the formation of the top plate 2 having also the characteristics of the design layer 6, without forming the design layer 6 of the first embodiment.

The effects overlapping with those of the first embodiment will not again be described.

Thus, according to this embodiment, in the top plate of a heating cooker using a black-based top plate in particular and in the display device using light-emitting elements such as LEDs, the reduction of visibility is improved such as the display position differing (looking recessed in particular) depending on the viewing angle from the top plate upper surface. The restrictions (emitted light is shaded) on the structures arranged in the vicinity of the display device are also improved. Furthermore, by spacing the display device apart from the top plate, the thermal effect from the cooking container to be heated is reduced so that the structures such as the light-emitting elements such as LEDs and the light guide used in this display device and the case of the display device can be formed of inexpensive materials with low heat resistance. A high-design, low-cost, convenient heating cooker can be provided that has both light-blocking properties and light-transmitting properties and presents uniform color and flatness over the entire top plate surface when viewed from the top plate upper surface without the internal structures such as the display device and the heater element being seen through during the non-heating.

A heating cooker can be provided that is capable of obtaining and adjusting the amount of light required for the visibility, and a heating cooker can also be provided that is capable of simplification and rationalization in the configuration such as reducing the number of light-emitting elements such as LEDs and eliminating the need for the disposition of the light guide, due to diffusion effect.

Use of the black-based colored low-expansion crystallized glass (black-based glass substrate 10) enables the formation of the top plate 2 having also the characteristics of the design layer 6, without forming the design layer 6 of the first embodiment, with the result that a heating cooker capable of simplification and rationalization can be provided.

As described above, according to the present invention, there can be provided a high-design, low-cost, convenient heating cooker that, in a top plate of the heating cooker using a black-based top plate and in a display device using light-emitting elements such as LEDs, has both light-blocking properties and light-transmitting properties and presents uniform color and flatness over the entire top plate surface when viewed from the top plate upper surface. Accordingly, the present invention is applicable not only to a desktop type, stand-alone type, or embedded type induction heating cooker for use on household dining table, countertop, sink, etc., or in business-use kitchen, but also to a heating cooker having a heat source other than the above, as well as a heating cooker of types other than the embedded type.

What is claimed is:

1. A heating cooker comprising:
a top plate on which a cooking container to be heated is placed;
an outer case having an upper surface on which the top plate is placed and making up a main body;
a heater element heating the cooking container to be heated on the top plate; and
a light emitting device disposed in the outer case, for displaying e.g. the state of heating effected by the heater element,
wherein the top plate comprising:
a glass substrate in the form of a transparent light-transmitting low-expansion crystallized glass made mainly of Li2O-AL2O3-SiO2 and having β-quartz solid solution as a main crystal, whose crystal size is smaller than the wavelength of visible light;
a design layer having a black-based color disposed on an undersurface of the glass substrate;
a diffusion region disposed partially on an undersurface of the design layer, for diffusedly emitting light from the light emitting device, the diffusion region containing a pearl pigment comprised of an inorganic pigment coated with a metal oxide; and
a light-blocking layer disposed on the undersurface of the design layer at least at a portion other than the diffusion region, for blocking light from below, the light-blocking layer containing an inorganic pigment.

2. A heating cooker comprising:
a top plate on which a cooking container to be heated is placed;
an outer case having an upper surface on which the top plate is placed and making up a main body;
a heater element heating the cooking container to be heated on the top plate; and
a light emitting device disposed in the outer case, for displaying e.g. the state of heating effected by the heater element,
wherein the top plate comprising:
a glass substrate in the form of a black-based colored low-expansion crystallized glass made mainly of Li2O-AL2O3-SiO2 and containing a black-based colorant as an additive and having β-quartz solid solution as a main crystal;
a diffusion region disposed partially on an undersurface of the black-based glass substrate, for diffusedly emitting light from the light emitting device, the diffusion region containing a pearl pigment comprised of an inorganic pigment coated with a metal oxide; and
a light-blocking layer disposed on the undersurface of the black-based glass substrate at least at a portion other than the diffusion region, for blocking light from below, the light-blocking layer containing an inorganic pigment.

3. The heating cooker according to claim 1, wherein the top plate has, in the glass substrate and the design layer, 60% or more of infrared transmissivity and 60% or less of visible light transmissivity, upward from the top plate.

4. The heating cooker according to claim 2, wherein the top plate has, in the black-based glass substrate, 60% or more of infrared transmissivity and 60% or less of visible light transmissivity, upward from the top plate.

5. The heating cooker according to claim 1, wherein the top plate has, in the glass substrate and the design layer and the diffusion region or in the black-based glass substrate and the diffusion region, 35 cd/m2 or more of light transmission amount from the light emitting device.

6. The heating cooker according to claim 1, wherein the diffusion layer contains an inorganic pigment adjusting color tone.

7. The heating cooker according to claim 1, wherein the pearl pigment has a particle diameter in a range of 1 μm-500 μm, larger than wavelengths of visible light.

8. The heating cooker according to claim 1, wherein the metal oxide that coats the inorganic pigment, of the pearl pigment has a particle diameter of 200 nm or less, smaller than wavelengths of visible light, the metal oxide having a coating thickness of 1 nm-500 nm.

9. The heating cooker according to claim 2, wherein the top plate has, in the glass substrate and the design layer and the diffusion region or in the black-based glass substrate and the diffusion region, 35 cd/m2 or more of light transmission amount from the light emitting device.

10. The heating cooker according to claim 2, wherein the diffusion layer contains an inorganic pigment adjusting color tone.

11. The heating cooker according to claim 2, wherein the pearl pigment has a particle diameter in a range of 1 μm-500 μm, larger than wavelengths of visible light.

12. The heating cooker according to claim 2, wherein the metal oxide that coats the inorganic pigment, of the pearl pigment has a particle diameter of 200 nm or less, smaller than wavelengths of visible light, the metal oxide having a coating thickness of 1 nm-500 nm.

* * * * *